United States Patent
Ito

(10) Patent No.: US 11,641,434 B2
(45) Date of Patent: May 2, 2023

(54) SERVER SYSTEM AND IMAGE FORMING DEVICE COMMUNICATING WITH SERVER SYSTEM

(71) Applicant: CANON KABUSHIKI KAISHA, Tokyo (JP)

(72) Inventor: Chie Ito, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/125,697

(22) Filed: Dec. 17, 2020

(65) Prior Publication Data
US 2021/0203798 A1 Jul. 1, 2021

(30) Foreign Application Priority Data
Dec. 25, 2019 (JP) .............................. JP2019-235085

(51) Int. Cl.
*H04N 1/00* (2006.01)
(52) U.S. Cl.
CPC ..... *H04N 1/00517* (2013.01); *H04N 1/00411* (2013.01)
(58) Field of Classification Search
CPC ........... H04N 1/00506; H04N 1/00517; H04N 1/00411; H04N 1/00408; G06F 3/1205
See application file for complete search history.

(56) References Cited

U.S. PATENT DOCUMENTS

| 2009/0128844 A1* | 5/2009 | Kondo ................. G06F 3/1288 358/1.15 |
| 2017/0257510 A1* | 9/2017 | Kuroyanagi ....... H04N 1/00204 |
| 2018/0052643 A1* | 2/2018 | Fujisawa ............... G06F 3/1206 |
| 2019/0050184 A1* | 2/2019 | Ozawa .................. G06F 3/1222 |

FOREIGN PATENT DOCUMENTS

JP 2017-118456 A 6/2017

* cited by examiner

*Primary Examiner* — Irina Cruz
(74) *Attorney, Agent, or Firm* — Canon U.S.A., Inc. IP Division

(57) ABSTRACT

A server system of the present disclosure is directed to displaying buttons, to which respective settings according to functions executable by an image forming device to which a user has logged in, are allocated. A server system includes an information processing device capable of communicating with an image forming device including a display unit. The server system includes a storage unit that stores a usage history of the image forming device, a reception unit that receives first information regarding a function executable by the image forming device, a determination unit that determines second information indicating settings allocated to respective buttons displayed by the display unit on a basis of the received first information and the usage history stored in the storage unit, and a transmission unit that transmits to the image forming device the second information indicating the settings allocated to the respective buttons determined by the determination unit.

13 Claims, 17 Drawing Sheets

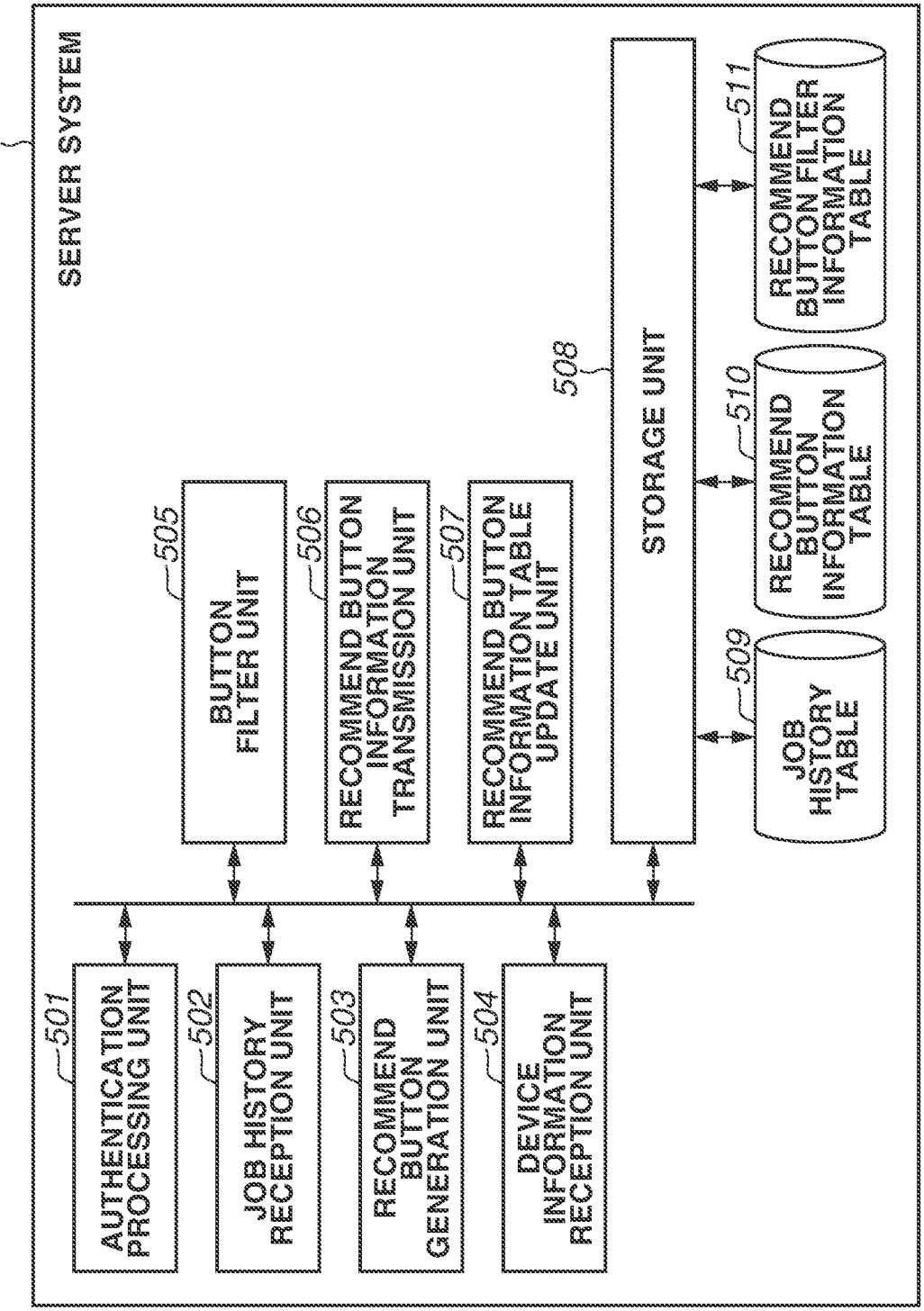

FIG.8

| User | Prio | Job Type | Job Settings |
|---|---|---|---|
| AAA | 1 | copy | copies: 3<br>color_mode: mono<br>plex: duplex |
| AAA | 2 | print | copies: 3<br>color_mode: color<br>staple: lefttop |
| AAA | 3 | scan to email | to: AAA@mail.xxx<br>dpi: 300<br>color_mode: color |
| AAA | 4 | box print | file: BOX\memo.txt<br>color_mode: color |
| AAA | 5 | print | color_mode: color<br>plex: simplex |
| ... | ... | | |
| BBB | 1 | print | color_mode: mono<br>plex: duplex |
| BBB | 2 | copy | copies: 2<br>color_mode: color |
| ... | ... | | |

```
"Hypertext Transport Protocol"
  HTTP/1.1 200 OK
  Server: CANON HTTP Server
  Content-Length: XXX
  Content-Type: application/ipp
  Connection: close "Internet Printing Protocol"
  Response = (
    operation-attributes-tag {
        "attributes-charset" = "utf-8";
        "attributes-natural-language" = "ja-jp";
    },
    printer-attributes-tag {

"charset-configured" = "utf-8";
        "charset-supported" = "utf-8";
        "color-mode-default" = default;
        "color-mode-supported" = (
         default,
         mono,
         color
        );                                                901
        "color-supported" = true;
        "compression-supported" = none;
        "copies-default" = 1;
        "copies-supported" =      {
         lower = 1;
         upper = 9999;
        };                                                902
        "sides-supported" = "one-sided"
        "finishings-supported" = none;

"document-format-supported" = ("application/octet-stream",
                                      "aplication/pdf");

<abbreviated> end-of-attribute-tag
  }
)
```

FIG.10A

| device capabilities | value | function | settings | setting's value |
|---|---|---|---|---|
| color-supported | false | print | color_mode | color |
| sides-supported | one-sided | print | plex | duplex |
| finishings-supported | none | print | staple | except none |
| . . . | | | | |
| printer-resolution-supported | any | fax | resolution | do not match device |
| | | | | |
| . . . | | | | |

FIG.10B

| job type | functions | | |
|---|---|---|---|
| copy | scan | print | |
| send to email | scan | send | |
| send to box | send | box | |
| send to memory | send | memory | |
| fax receive | fax | receive | print |
| fax memory receive | fax | receive | memory |
| print | print | | |
| . . . | . . . | . . . | . . . |

FIG.11

```
{
  "name": "copy", ~1101
  "icon": "copy_mono.png", ~1102
  "info": {
   "line1": "BW, 3 copies, single-sided", ~1103
  },
   "order": 1, ~1104
   "parameters": {
    "jobtype": "copy", ~1105
    "settings": {
     "copies": 3,
     "color_mode": "mono",        } 1106
     "plex": "simplex",
    }
  }
},
{
  "name": "print",
  "icon": "print_color.png",
  "info": {
   "line1": "CL, 3 copies, staple",
  },
   "order": 2,
   "parameters": {
    "jobtype": "print",
    "settings": {
     "copies": 3 ,
     "color_mode": "color",
     "staple": "lefttop",
    }
  }
},
```

FIG.14

| device status | function | settings | setting's value |
|---|---|---|---|
| color toner out | print | color_mode | color |
| black toner out | print | color_mode | mono |
| jam | print | all | |
| staple out | print | staple | except none |
| A4 paper out | print | paper-size | A4 |
| scan sensor error | scan | all | |
| . . . | | | |

SERVER SYSTEM AND IMAGE FORMING DEVICE COMMUNICATING WITH SERVER SYSTEM

BACKGROUND

Field of the Disclosure

The present disclosure relates to a server system and an image forming device that communicates with the server system.

Description of the Related Art

An image forming device includes a display, and is capable of accepting a user operation via a graphical user interface (GUI) displayed on the display. Typically, a user can execute his/her desired function and change a setting by selecting a button displayed on a screen (home screen) that is a starting point of an operation. Buttons corresponding to respective functions of the image forming device such as pint, copy, and fax, are displayed on the home screen. The user can call the desired function by selecting a displayed button. In addition to the buttons for calling the basic functions of the image forming device as described above, various buttons, such as a button for using an additional function, and a shortcut button to which a job setting value has been allocated in advance, are arranged on the home screen.

It has been known that even if buttons displayed on the home screen are increased, the arrangement of the buttons are dynamically changed on the basis of the user's usage history information or the like so that the user can find a button to be used at once. In Japanese Patent Application Laid-Open No. 2017-118456, for example, a display order of buttons is determined such that buttons frequently used by the user are displayed at the front.

Determination of the buttons displayed on the home screen may be on the basis of the user's past usage history information. In a case where the user uses a plurality of image forming devices having different executable functions, it can be considered that a server system receives usage histories from the respective image forming devices and generates information of a button to which a setting value is allocated based on the usage histories. Since the information of the button is generated on the basis of the usage histories collocated from the plurality of image forming devices having the different functions, there is a possibility that part of the generated information of the buttons allocates a setting inexecutable by part of the image forming devices to a button. Thus, if the information of the button to which the setting value is allocated is transmitted regardless of an image forming device to which the user has logged in, it can be considered that information of a button may be transmitted to which a setting unavailable by the image forming device to which the user has logged in is allocated.

Assume that the user uses both an image forming device capable of executing both color copy and monochrome copy, and an image forming device capable of only monochrome copy. In this case, a print history of print by color copy and a print history of print by monochrome copy are both stored as the user's usage history. Consequently, even in a case where the user has logged in to the image forming device capable of only monochrome copy, a button to which a setting of color copy is allocated is displayed.

SUMMARY

According to embodiments of the present disclosure, a server system includes an information processing device configured to be capable of communicating with an image forming device including a display unit. The server system includes a storage unit configured to store a usage history of the image forming device, a reception unit configured to receive first information regarding a function executable by the image forming device, a determination unit configured to determine second information indicating settings to be allocated to respective buttons to be displayed on the display unit on a basis of the received first information and the usage history stored in the storage unit, and a transmission unit configured to transmit to the image forming device the second information indicating the settings to be allocated to the respective buttons determined by the determination unit.

Further features of the present disclosure will become apparent from the following description of exemplary embodiments (with reference to the attached drawings).

BRIEF DESCRIPTION OF THE DRAWINGS

FIG. 5 is a diagram illustrating a software configuration example of the server system.

FIG. 8 is a diagram illustrating an example of a recommend button information table stored in the server system.

FIG. 9 is a diagram illustrating an example of capability information of the image processing device.

FIG. 10A is a diagram illustrating an example of a recommend button filter information table of the server system. FIG. 10B is a diagram illustrating an example of a table that manages jobs and constituent functions.

FIG. 11 is a diagram illustrating an example of recommend button information to be transmitted from the server system to the image forming device.

FIG. 14 illustrates an example of a recommend button filter information table used by the image forming device to filter the recommend button information received from the server system.

DESCRIPTION OF THE EMBODIMENTS

An exemplary embodiment of the present disclosure will be described in detail below with reference to the accompanying drawings. In the present exemplary embodiment, a description will be given of an image forming device using an example of a multi-function peripheral having a print function, a scan function, and a fax function, the present exemplary embodiment does not limit the disclosure. Combinations of features described in the present exemplary embodiment are not necessarily essential to means for solving the issues of the present disclosure.

Figure 1:
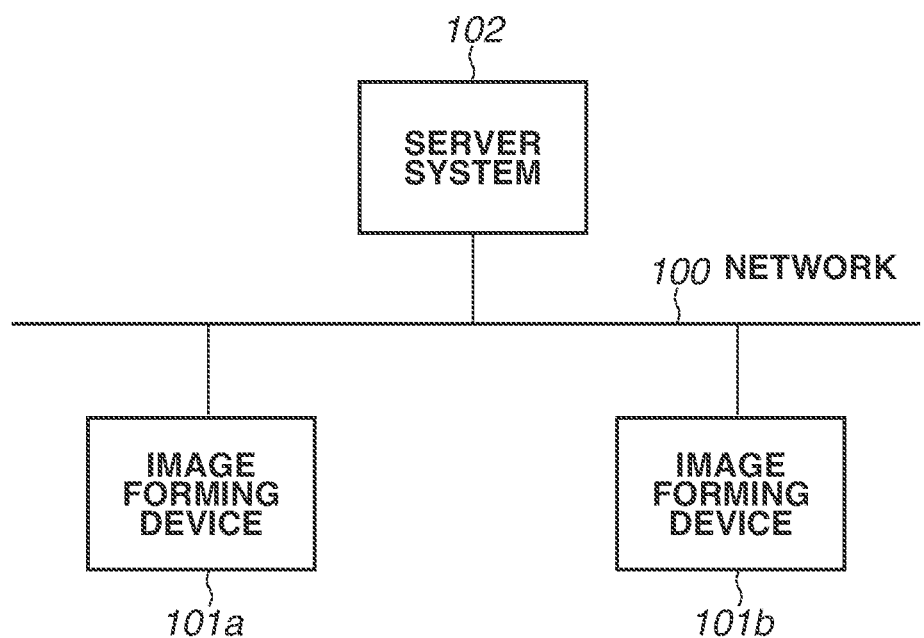
FIG. 1 is a diagram illustrating an example of an overall configuration of an information processing system described in the present specification.

FIG. 1 is a diagram illustrating a system configuration of an image processing system according to the present exemplary embodiment. An image forming device 101a, an image forming device 101b, and a server system 102 are connected via a network 100 to be able to communicate with one another. The image forming devices 101a and 101b may be of the same model, or of different models. That is, the image forming device 101a may be a multi-function peripheral having a plurality of functions such as the print function, the scan function, and the fax function, and the image forming device 101b may be a single-function peripheral (SFP) having only the print function. Alternatively, a plurality of image forming devices and/or a plurality of servers, which are not illustrated, may be connected.

In the following description, the image forming device 101a is assumed to be an image forming device 101.

The server system 102 has a function of generating information of a button to which a job setting value is allocated (hereinafter referred to as recommend button information) and transmitting the information to the image forming device 101. Whether the server system 102 is composed of a single information processing device or a plurality of information processing devices is not specifically limited in the present exemplary embodiment. In addition, the image forming device 101 and the server system 102 may be on the same network or different networks.

Figure 2:
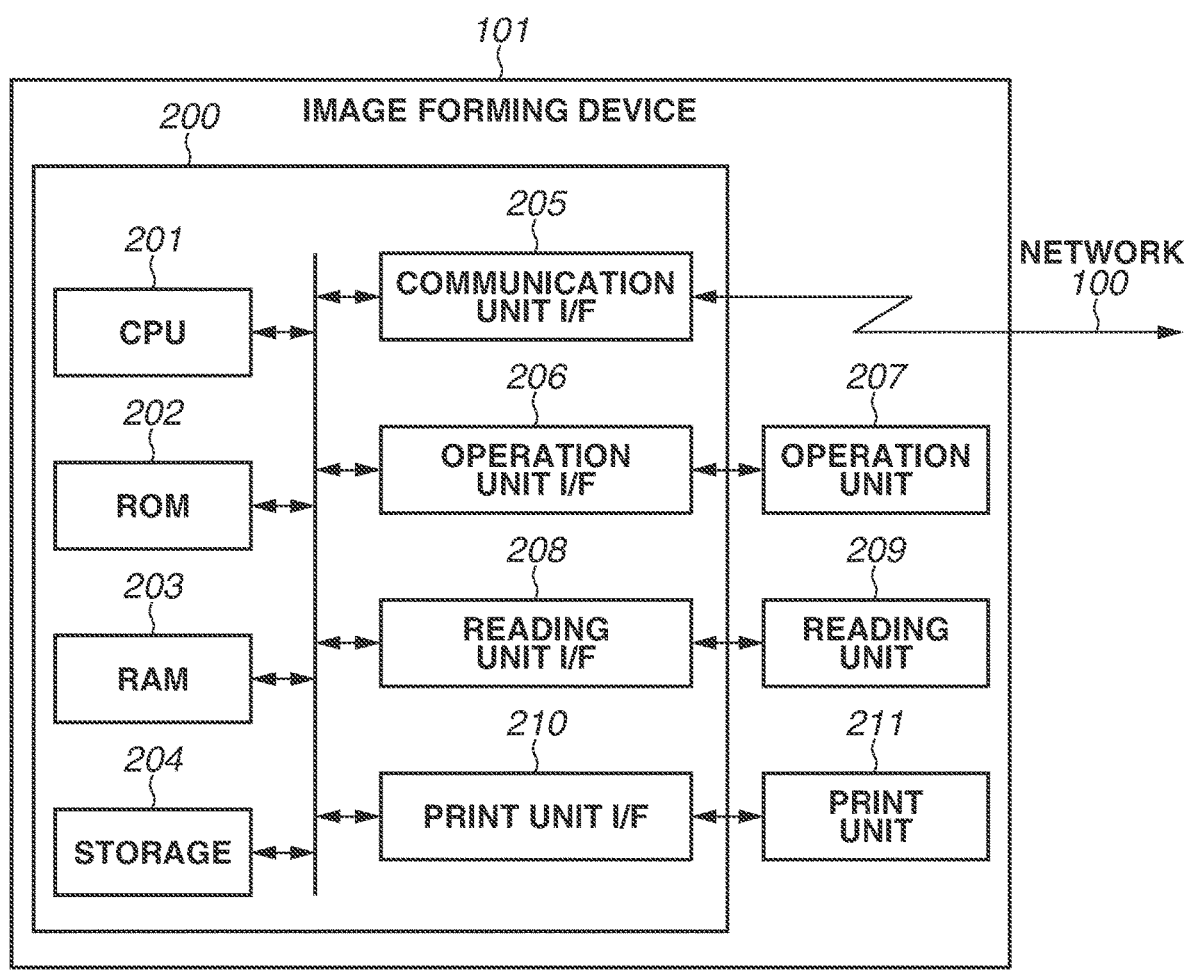
FIG. 2 is a diagram illustrating a hardware configuration example of an image forming device.

FIG. 2 is a block diagram illustrating a hardware configuration of the image forming device 101 according to the present exemplary embodiment. The image forming device 101 has a reading function of reading an image on a sheet, and the print function of printing an image on a sheet. Besides these functions, the image forming device 101 has a file send function of sending image data to an external device.

In the present exemplary embodiment, a description will be given of the image forming device 101 as an image processing device, but the image processing device is not limited thereto. For example, a print device such as a printer without the reading function may be used as the image processing device. Alternatively, an image reading device such as a scanner without the print function may be used.

A control unit 200 including a central processing unit (CPU) 201 controls operations of the whole of the image forming device 101. The CPU 201 reads a control program stored in a read-only memory (ROM) 202 or a storage 204, and performs various kinds of control such as reading control and print control. The ROM 202 stores the control program executable by the CPU 201. A random-access memory (RAM) 203 is a main memory of the CPU 201, and used as a work area and a temporary storage area to load various kinds of control programs stored in the ROM 122 and the storage 204. The storage 204 stores print data, image data, various kinds of programs, and various kinds of setting information. In the image forming device 101 according to the present exemplary embodiment, one CPU 201 executes each processing illustrated in flowcharts, which will be described below, using one memory (RAM 203), but another mode may be employed. For example, the image forming device 101 can also execute each processing indicated in the flowcharts, which will be described below, by causing a plurality of CPUs, a plurality of RAMs, a plurality of ROMs, and a plurality of storages to collaborate with one another. Alternatively, part of the processing may be executed using a hardware circuit such as an application-specific integrated circuit (ASIC) or a field-programmable gate array (FPGA) circuit.

An operation unit I/F 206 connects the control unit 200 to an operation unit 207. The operation unit 207 displays information to a user, and detects input from the user.

A reading unit I/F 208 connects the control unit 200 to a reading unit 209. The reading unit 209 reads an image on a sheet and generates image data. The image data generated by the reading unit 209 is transmitted to the external device. An image is printed on a sheet using the image data generated by the reading unit 209. The reading unit 209 also can read sheets loaded on a document feeder (not illustrated) while conveying one sheet by one sheet.

A print unit I/F 210 connects the control unit 200 to a print unit 211. The image data to be printed is transferred to the print unit 211 via the print unit I/F 210. The print unit 211 receives a control command and the image data to be printed, and prints the image on the sheet based on the image data using a recording material. The recording material may be toner or ink. A print method of the print unit 211 may be an electrophotographic method or an inkjet method. The electrophotographic method is to form an image by forming an electrostatic latent image on a photosensitive body, thereafter, developing a toner image by toner, transferring the toner image to the sheet, and fixing the transferred toner image. In contrast, the inkjet method is to print an image on a sheet by ejecting ink. The image forming device 101 is connected to the network 100 via a communication unit I/F 205. The communication unit I/F 205 is connected to the server system 102 on the network 100 to be able to communicate information, and receives recommend button information to be displayed on a home screen of the image forming device 101.

Print data received via the communication unit I/F 205 is analyzed by a software module (a page description language (PDL) analysis unit, not illustrated) for analyzing print data stored in the storage 204 or the ROM 202. The PDL analysis unit generates data to be printed on the print unit 211 based on print data expressed in various kinds of PDL.

Figure 3:
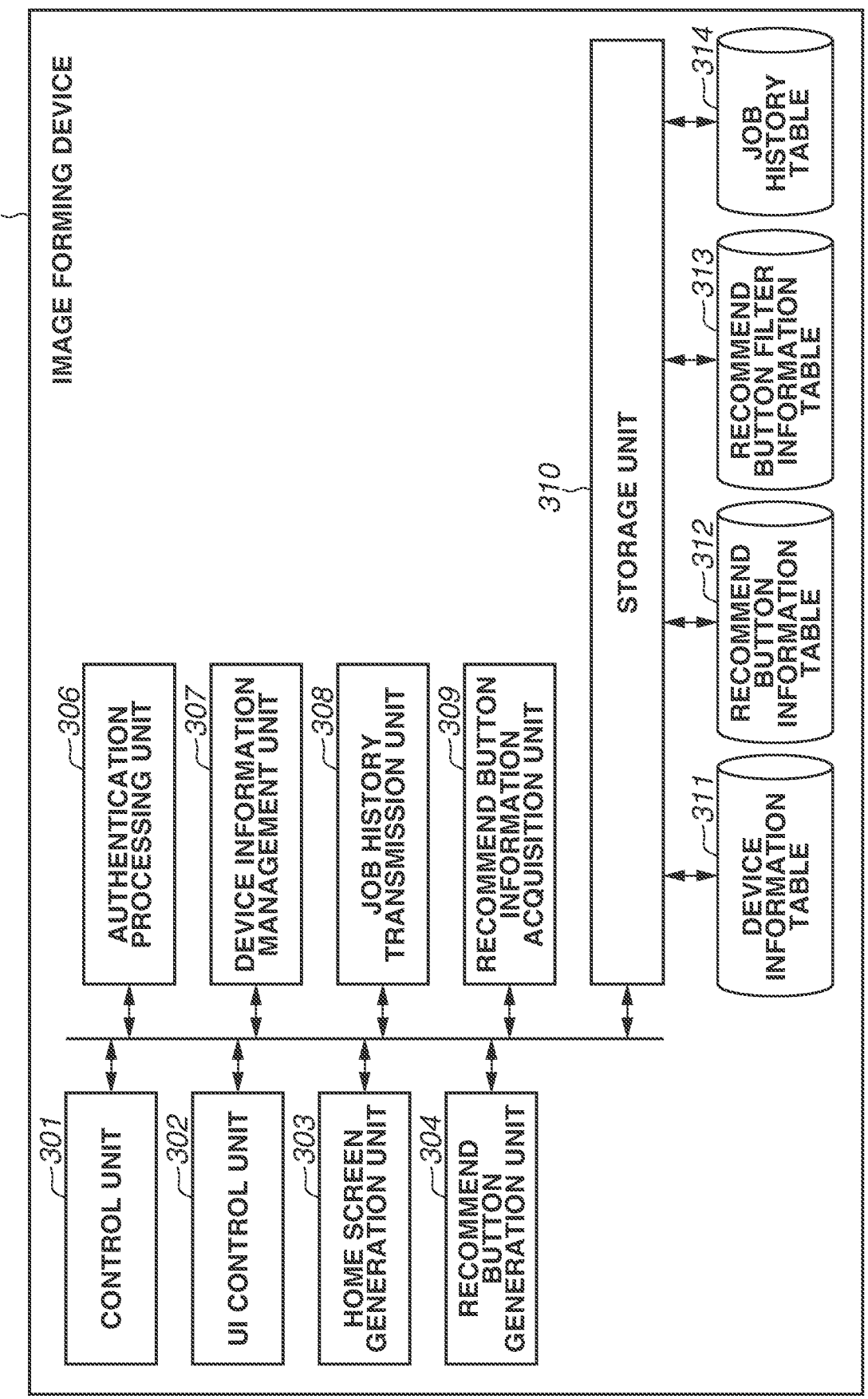
FIG. 3 is a diagram illustrating a software configuration example of the image forming device.

FIG. 3 is a block diagram illustrating a software configuration of the image forming device 101 according to the present exemplary embodiment. Each of software blocks illustrated in FIG. 3 is implemented by the CPU 201 executing a program stored in the ROM 202 or the storage 204.

A control unit 301 controls other modules, and performs centralized control of each processing generated in the image forming device 101, such as scan, transmission, and display processing. In addition, the control unit 301 instructs the storage unit 310 to store an operation history of the image forming device 101 regarding execution of jobs, job setting information, and the like in a job history table, which will be described below.

An authentication processing unit 306 accepts a log-in/log-out request from the user. Upon accepting the log-in request, the authentication processing unit 306 transmits authentication information to the server system 102 and receives a result of authentication. If the authentication has succeeded, the authentication processing unit 306 instructs a user interface (UI) control unit 302 and a home screen generation unit 303 to display the home screen.

The UI control unit 302 controls the operation unit 207 via the operation unit OF 206. Specifically, the UI control unit 302 controls the operation unit 207 to display user notification, options, and the like, accepts a user operation on the operation unit 207, and notifies the other function units of a content of the operation. In the present exemplary embodiment, the UI control unit 302 presents a screen (home screen) that is a starting point of an operation of the image forming device 101 to the user.

The home screen generation unit 303 executes screen generation processing of generating windows, icons, and the like arranged on the home screen. The home screen generation unit 303 acquires recommend button information from a recommend button generation unit 304, which will be described below, generates screen information, and causes the operation unit 207 to display the home screen via the UI control unit 302.

A device information management unit 307 manages device capability information and device status information of the image forming device 101, and stores the information in a device information table 311. Examples of the device capability information include information indicating that the image forming device 101 has no color print capability in a case where the image forming device 101 is a monochrome print machine, and information indicating that the image forming device 101 has no stapling capability in a case where the image forming device 101 has no finisher. Examples of the device status information include information indicating statuses such as an out-of-color toner status, a jam status, and a no-paper status. The device information management unit 307 updates the status stored in the device information table 311 if any change is made.

A recommend button information acquisition unit 309 communicates with the server system 102 and acquires the recommend button information. Upon receiving the recommend button information from the server system 102, the recommend button information acquisition unit 309 instructs a storage unit 310 to store the received recommend button information in a recommend button information table 312.

A recommend button filter information table 313 is a table to filter out a button including a function that is possibly inexecutable on the basis of the device status information. The table stores which function is restricted in what kind of status the image forming device is in. Details will be described below.

The recommend button generation unit 304 filters the recommend button information by referring to the device information table 311, the recommend button information table 312, and the recommend button filter information table 313.

A job history transmission unit 308 transmits job history information stored in a job history table 314 to the server system 102. For example, a type of a job executed in the image forming device 101, a setting value set when the job has been executed, and a user who has instructed to execute the job are stored in correspondence with the date and time in the job history table 314.

In response to an instruction from another function unit, the storage unit 310 stores designated data in the ROM 202, the RAM 203, or the storage 204, or reads stored data. In the present exemplary embodiment, the storage unit 310 manages the device information table 311, the recommend button information table 312, the recommend button filter information table 313, and the job history table 314 that are stored in the storage 204 of the image forming device 101.

Figure 4:
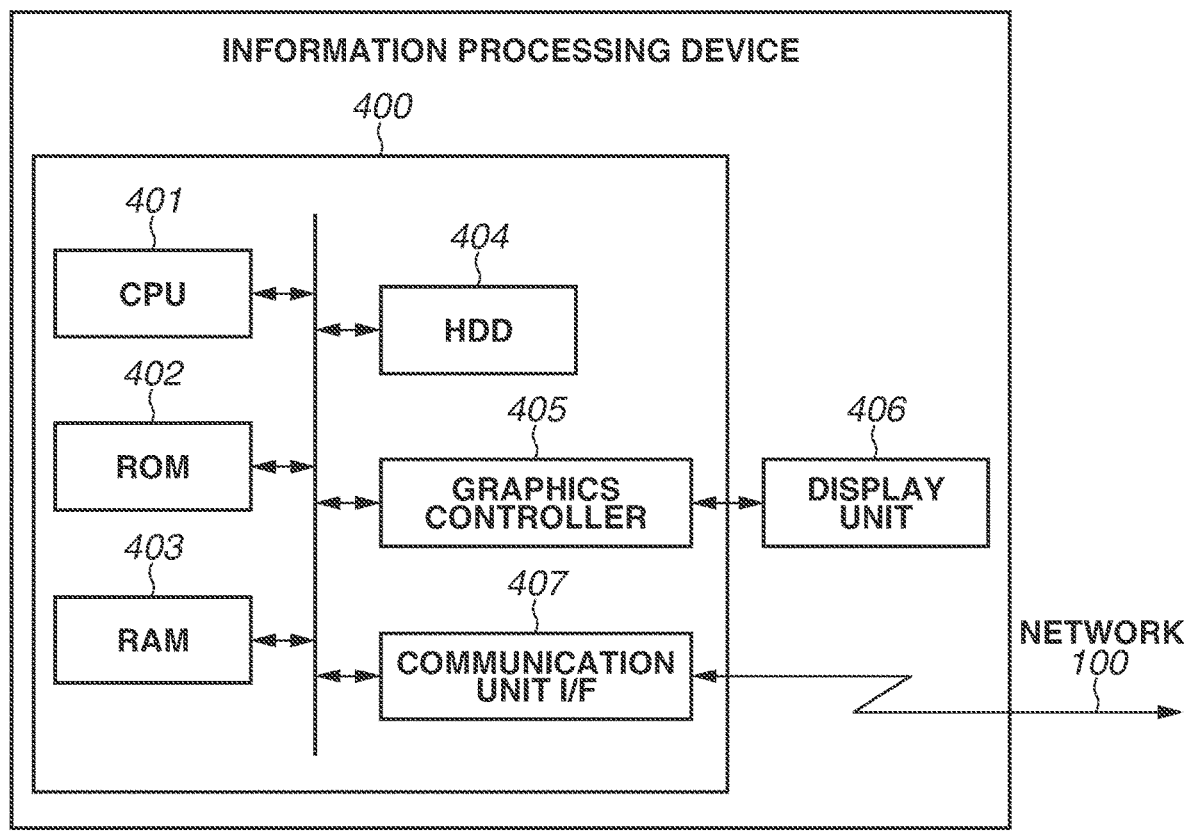
FIG. 4 is a diagram illustrating a hardware configuration example of a server system.

FIG. 4 is a block diagram illustrating a hardware configuration of the information processing device constituting the server system 102 according to the present exemplary embodiment.

A control unit 400 including a CPU 401 controls operations of the whole of the information processing device. The CPU 401 is composed of an arithmetic circuit, and loads a program stored in a ROM 402 or a hard disk drive (HDD) 404 to a RAM 403 to execute various kinds of processing. The ROM 402 stores a system program and the like to be used for controlling the server system 102. A graphics controller 405 generates a screen to be displayed on a display unit 406. The HDD 404 has a function as a storage area, and stores an application program and the like for executing various kinds of processing. The HDD 404 is one example of a storage device, and may be composed of a solid state drive (SSD) besides the HDD. A communication unit I/F 407 is an interface to connect various kinds of devices to the server system 102. For example, a display, a keyboard, and a mouse can be connected to the server system 102 via the communication unit I/F 407. In addition, the communication unit I/F 407 communicates with the image forming device 101 and the like via the network 100 on the basis of control by the CPU 401.

FIG. 5 is a software block diagram of the server system 102 according to the present exemplary embodiment. Each function unit illustrated in FIG. 5 is implemented by the CPU 401 of the information processing device constituting the server system 102 executing a program stored in the ROM 402 or the HDD 404. A software block illustrated in FIG. 5 may be implemented by one information processing device constituting the server system 102 or by a plurality of information processing devices in collaboration.

An authentication processing unit 501 manages users who use a plurality of image forming devices including the image forming device 101 connected to the server system 102. Upon receiving a request for log-in authentication from the image forming device 101, the authentication processing unit 501 executes authentication processing, and returns a result of the authentication. If the authentication has succeeded, the authentication processing unit 501 stores a current log-in user (for example, user identification (ID): AAA) in a storage unit 508.

A job history reception unit 502 receives job history information transmitted from the image forming device 101, and instructs the storage unit 508 to store the job history information in a job history table 509 in correspondence with identification information of a user who has instructed the execution of a job with a received setting.

A recommend button generation unit 503 generates recommend button information on the basis of the job history information stored for each user in the job history table 509. The information is not limited to the job history information, and the recommend button generation unit 503 may generate a button predicted to be more likely to be executed by the user in combination with another information. A method of generating the recommend button information is not limited to the following method, and the recommend button generation unit 503 may generate the recommend button information using machine learning or the like.

The recommend button information is composed of execution job information indicating a combination between a type of a job to be executed when a button is selected and a setting value of the job, and button display priority information. After generating the recommend button information, the recommend button generation unit 503 instructs the storage unit 508 to store the generated recommend button information in a recommend button information table 510. The recommend button information for each user is stored in the recommend button information table 510.

A device information reception unit 504 acquires the device capability information of the image forming device 101 when a request for acquiring the recommend button information is made from the image forming device 101, and stores the device capability information in the storage unit 508.

A recommend button filter information table 511 is a table that defines functions and settings that are affected by a device capability. For example, in the case where the image forming device 101 is the monochrome print machine and thus cannot perform color print, the recommend button filter information table 511 defines such information that a color print setting is affected by presence/absence of a color print capability.

A button filter unit 505 checks the capability information of the image forming device 101 stored in the storage unit 508 against the information of the recommend button filter information table 511, and filters recommend buttons to be transmitted to the image forming device 101. The button filter unit 505 acquires the recommend button information of the user who has logged in to the image forming device 101 from the recommend button information table 510, and narrows down the recommend buttons to be transmitted on the basis of the capability information of the image forming device 101 and recommend button filter information.

A recommend button information transmission unit 506 transmits the recommend button information in response to a request for the recommend button information from the image forming device 101.

If a job history of the user is added to the job history table 509, a recommend button information table update unit 507, in coordination with the job history reception unit 502, updates the recommend button information stored in the recommend button information table 510 on the basis of the added job history.

In response to an instruction from another function unit, the storage unit 508 stores designated data in the ROM 402, the RAM 403, or the HDD 404, or reads stored data. In the present exemplary embodiment, the storage unit 508 manages the job history table 509, the recommend button information table 510, and the recommend button filter information table 511 that are stored in the HDD 404 of the server system 102.

Figure 6A:
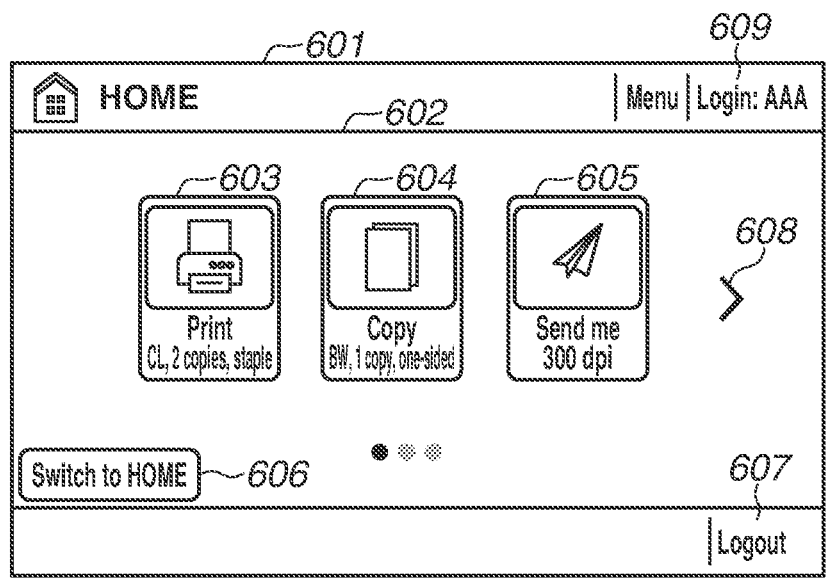
FIG. 6A is a diagram illustrating an example of a home screen of the image forming device.

FIG. 6A illustrates an example of a home screen 601 which is displayed on the operation unit 207 and on which recommend buttons are arranged, according to the present exemplary embodiment. The ID of the user AAA, who is the current log-in user, is displayed in a log-in user name display area 609. In a case where the user selects a log-out button 607, the image forming device 101 makes the user AAA log out thereof.

The recommend buttons (such as an immediate execution print button 603, an immediate execution copy button 604, and an immediate execution scan button 605) to instruct respective functions of the image forming device 101 are displayed on the home screen 601. Each recommend button is a button in association with a predetermined setting value. In a case where the user selects a recommend button, the user can perform print, scan, or transmission of image data without newly making a corresponding setting.

In the present exemplary embodiment, if the user selects a recommend button, a job is immediately executed on the basis of a job setting value included in the recommend button information without any change, but a setting screen on which a setting value in association with the recommend button is set may be displayed.

The recommend buttons are arranged in a recommend button display area 602 of the home screen 601.

The recommend button display area 602 has a plurality of pages, and different buttons are arranged in each page. A page to be displayed on the recommend button display area 602 is switched by the user dragging or flicking the operation unit 207, or selecting a page switch button 608 on the operation unit 207.

Figure 17:
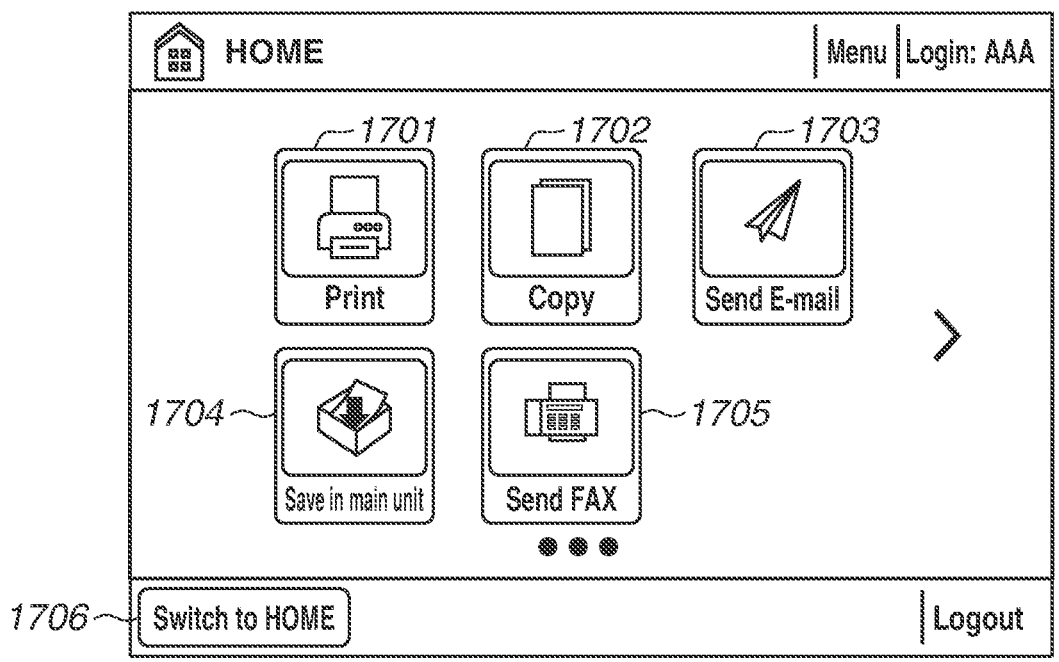
FIG. 17 is a diagram illustrating an example of a conventional home screen that is displayed on an operation unit of the image forming device and that does not use the recommend button information.

In the present exemplary embodiment, the recommend buttons are displayed in the recommend button display area 602 in order of display priority from the left. That is, a recommend button with the highest display priority is displayed on the leftmost side on the first page. A home screen switch button 606 is not a recommend button, but a button to display a conventional home screen. Buttons to call respective functions of the image forming device 101 are displayed on the conventional home screen, as illustrated in FIG. 17. For example, a "Print" button 1701 is a button to print image data that is received from an external information processing device and that is stored in the image forming device 101. If the user selects the "Print" button 1701, a screen for selecting image data to be printed is displayed. If the user selects the image data and presses a start key, print is started. A "Copy" button 1702 is a button to cause the reading unit 209 to read an original document, generate image data, and cause the print unit 211 to print an image based on the generated image data. If the user selects the "Copy" button 1702, a screen for making settings regarding reading and print including copies, a type of an original document to be read, simplex reading or duplex reading, and simplex print or duplex print is displayed. If the user makes a setting via the screen and presses a start key, a job is created and the reading of the original document is started. An "Send E-mail" button 1703 has a function to cause the reading unit 209 to read the original document, and send the generated image data by e-mail. If the user selects the "Send E-mail" button 1703, a screen for setting a type of the original document to be read, a destination of sending, a resolution of the image data to be sent, and the like, is displayed. If the user makes a setting and presses a start key, the reading of the original document is started. A "Save in main unit" button 1704 is a button having a function to store the original document read by the reading unit 209 in a memory of the main unit. A "Send Fax" button 1705 is a button having a function to send the original document read by the reading unit 209 by fax. Each of these buttons is a button for displaying a screen for setting a job, but not a button to immediately start the job when selected nor display a screen for confirming whether to execute the job with the user, unlike the recommend button. The conventional home screen can cause more buttons to be displayed at one time than those displayed on the screen illustrated in FIG. 6A. Furthermore, the buttons displayed on the conventional home screen are not buttons that are received from the server system 102, but buttons that can be displayed by information stored in the image forming device 101.

A "Switch to HOME" button 1706 is a button to display the home screen illustrated in FIG. 6A.

Figure 6B:
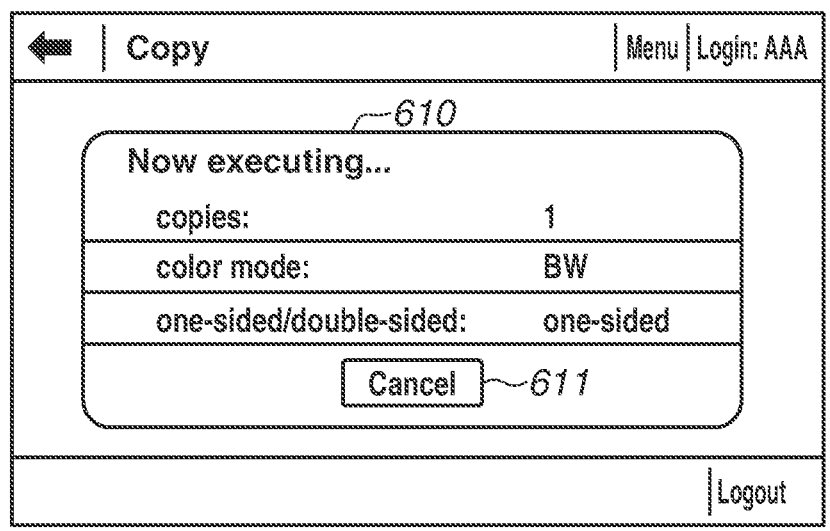
FIG. 6B is a diagram illustrating an example of an execution screen after a recommend button is pressed.

FIG. 6B illustrates an example of a screen displayed in a case where the user selects the recommend button 604 for copy. If the user selects the recommend button 604, copy is started with a setting included in the recommend button information. Furthermore, a message 610 indicating "Now executing . . . " illustrated in FIG. 6B is displayed on the operation unit 207. The message 610 is a message indicating a setting with which the job is being executed. A "Cancel" button 611 is displayed on the screen. If the user selects the "Cancel" button 611, the copy being in execution is canceled.

Figure 6C:
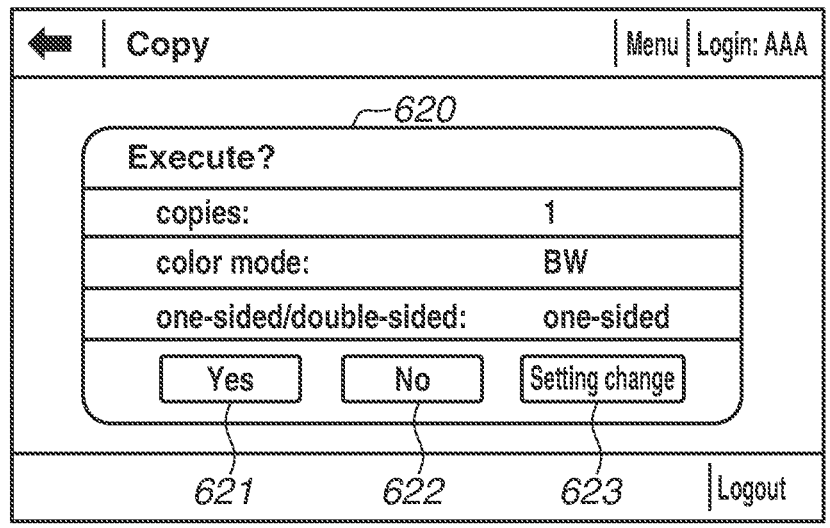
FIG. 6C is a diagram illustrating an example of a setting screen after the recommend button is pressed.

FIG. 6C illustrates an example of a setting confirmation screen 620 that is displayed, after the user selects the recommend button 604 for copy, to confirm a setting corresponding to the recommend button 604 with the user. In a case where the user executes copy with a setting included in the recommend button information without any change, the user selects a "Yes" button 621. In a case where the user wants to end without executing the job, the user selects a "No" button 622. In a case where the user selects the "No" button 622, the image forming device 101 closes the setting confirmation screen 620, and displays the home screen 601. In a case where the user wants to change a job setting corresponding to a recommend button, the user selects a "Setting change" button 623. In a case where the user selects the "Setting change" button 623, a copy setting screen (not illustrated) is displayed. The user makes a setting on the displayed copy setting screen.

Whether the job is immediately executed or the setting screen is displayed after the recommend button is pressed may be set on another setting screen (not illustrated) or determined on the screen where the recommend button is pressed. For example, the image forming device 101 also may display the setting screen if an area in a range in which the setting information is displayed is pressed, and immediately execute the job if an icon image area is pressed. Alternatively, the image forming device 101 display the setting screen if the recommend button is pressed and held down.

In a case where the user selects the recommend button to start the job, the image forming device 101 executes the job in accordance with a default setting of the image forming device 101 with respect to a setting item not in correspondence with the recommend button information.

Figure 7:
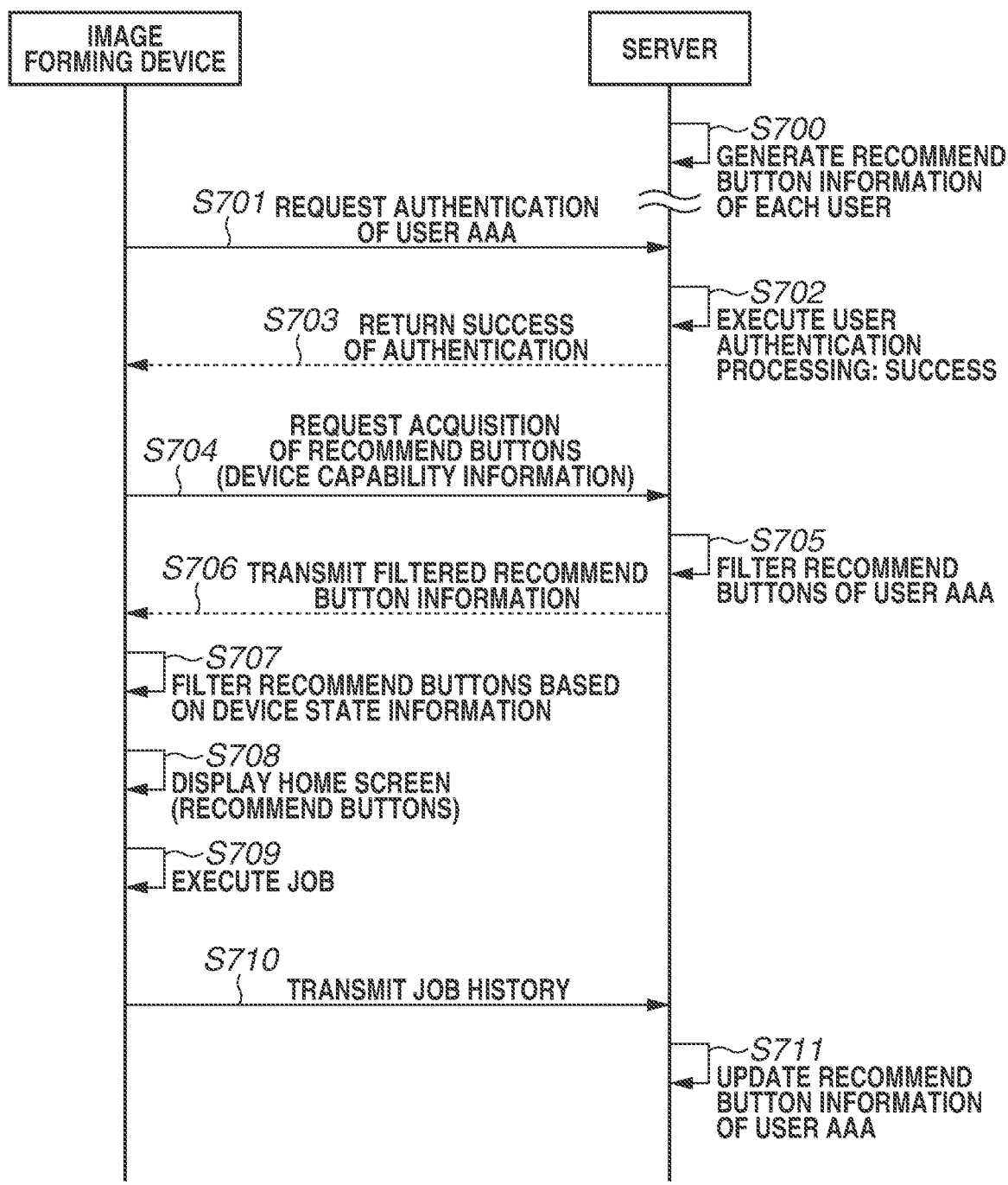
FIG. 7 is a sequence diagram illustrating processing between the image forming device and the server system.

FIG. 7 is a sequence diagram illustrating processing executed when the image forming device 101 displays the recommend buttons on the home screen 601 and executes the job.

In step S700, the server system 102 causes the recommend button generation unit 503 to generate the recommend button information of each user, and stores the recommend button information in the recommend button information table 510. The user AAA performs an operation to log in to the image forming device 101. In step S701, the authentication processing unit 306 of the image forming device 101 transmits authentication information of the user AAA to the server system 102 to request authentication. Here, the image forming device 101 transmits user-identification information such as a user name and a password for user authentication to the server system 102. In step S702, the authentication processing unit 501 of the server system 102 executes the authentication processing. In step S703, if the authenticate has succeeded, the server system 102 returns the success of the authentication to image forming device 101.

In step S704, the image forming device 101, which have received the success of the authentication, makes a request for the recommend button information to the server system 102 via the recommend button information acquisition unit 309 in order to display the home screen 601. At this time, the recommend button information acquisition unit 309 transmits to the server system 102 the device capability information of the image forming device 101 stored in the device information table 311 together. Alternatively, the server system 102 may make the request for the device capability information, and the image forming device 101 may respond to the request.

The device information reception unit 504 of the server system 102 stores the received device capability information in the storage unit 508. In step S705, the button filter unit 505 filters the recommend button information of the user AAA on the basis of the device capability information of the image forming device 101 and the recommend button filter information. In step S705, the server system 102 extracts the recommend button information corresponding to the authenticated user AAA from the recommend button information table. Furthermore, the server system 102 extracts recommend button information executable by the image forming device 101 that has transmitted the request for authentication from the extracted recommend button information, on the basis of the device capability information received from the image forming device 101 in step S704. This processing, for example, prevents recommend button information to execute the fax function from being transmitted to the image forming device 101 even though the image forming device 101 has no fax function.

In step S706, the recommend button information transmission unit 506 of the server system 102 transmits the filtered recommend button information to the image forming device 101. Details of the recommend button information transmitted in step S706 will be described below with reference to FIG. 11. The recommend button information acquisition unit 309 receives the recommend button information from the server system 102 and stores the recommend button information in the recommend button information table 312. In step S707, the recommend button generation unit 304 filters the recommend button information stored in the recommend button information table 312 on the basis of the recommend button filter information table 313. Here, the recommend button generation unit 304 filters the recommend buttons in accordance with the status of the image forming device 101. For example, in a case where the image forming device 101 runs out of toner and cannot execute print immediately, recommend buttons for functions using toner such as copy and print become not displayed. There is a possibility that the status of the image forming device 101, such as an out-of-toner status, an out-of-paper status, or a jam status, is immediately resolved by the user's operation of replacing toner, refilling paper, canceling a jam, or the like. Thus, the filtering executed in step S707 may be such processing as to change the display priorities of the recommend buttons in accordance with the status of the image forming device 101, instead of deleting the recommend button information. For example, in a case where the image forming device 101 cannot execute print immediately due to the out-of-toner status, the out-of-paper status, the jam status, or the like, the image forming device 101 lowers priorities of the recommend buttons for functions using the print unit 211 such as copy and print functions. On the other hand, the image forming device 101, for example, raises priorities of the recommend buttons for functions without using the print unit 211 such as scan and send functions.

In step S708, the home screen generation unit 303 of the image forming device 101 receives the recommend button information filtered by the recommend button generation unit 304, generates screen information constituting the home screen 601, and causes the operation unit 207 to display the home screen 601 via the UI control unit 302.

In step S709, the user AAA selects his/her desired button from the displayed recommend buttons, and instructs execution of a job. Upon execution of the job, the control unit 301 writes usage history information such as the execution date and time of the job, and the setting value of the job, and the name of the user who has executed the job in the job history table 314.

In step S710, the job history transmission unit 308 of the image forming device 101 transmits a job history of the executed job to the server system 102 as a usage history. The job history reception unit 502 of the server system 102 stores the received job history in the job history table 509. Assume that the job history transmission unit 308 transmits only the job history added in step S709 to the server system 102 as the usage history.

In step S711, the recommend button information table update unit 507 updates the recommend button information of the user AAA stored in the recommend button information table 510 on the basis of the job history as the usage history added to the job history table 509. Specifically, the recommend button information table update unit 507, for example, generates a new recommend button, and changes the priorities of the existing recommend buttons.

In FIG. 7, it is assumed that the image forming device 101 transmits the job history to the server system 102 every time the image forming device 101 executes one job and a server generates the recommend button information. Alternatively, the image forming device 101 may communicate with the server system 102 at predetermined time intervals and transmit one or more job histories added to the job history table since the last communication with the server system 102 as a unit to the server system 102. In addition, the image forming device 101 may transmit job histories yet to be transmitted as a unit to the server system 102 if the number of the job histories yet to be transmitted reaches a predetermined number. Alternatively, the image forming device 101 may transmit a job history of jobs that have been executed by the user after logging in to the server system 102 when the user logs out of the image forming device 101. In FIG. 7, it is assumed that the server system 102 also generates the recommend buttons and determines the display priories of the recommend buttons every time the job history is transmitted thereto. Alternatively, the server system 102 may execute such processing at predetermined time intervals or generate the recommend buttons and set the display priorities of the recommend buttons if the number of job histories yet to be processed reaches a predetermined number.

FIG. 8 illustrates an example of the recommend button information table 510 of the server system 102 according to the present exemplary embodiment.

An item of User 801 is user-identification information, and indicates to which user the recommend button information belongs. An item of Prio 802 is information to determine the display order of the recommend buttons, and indicates display priorities. In the present exemplary embodiment, assume that the smaller number of the Prio 802 indicates the higher display priority, and the ascending order of the number of the Prio 802 corresponds to the display order of the recommend buttons. An item of Job Type 803 defines which function of an application is used by a corresponding recommend button to execute a job. The Job Type 803 has types of "print", "copy", "send", "fax", and the like. The "print" means a function to read and print image data received from an external device such as a personal computer (PC) and image data stored in a universal serial bus (USB) memory. The "copy" means a function to execute print by the print unit 211 on the basis of image data read by the reading unit 209. The "send" means a function to send image data read by the reading unit 209 to an external device by e-mail and send a file to a folder designated by the user. The "fax" means a function to send image data read by the reading unit 209 and image data stored in the storage 204 of the image forming device 101 by fax.

A setting value allocated to a corresponding recommend button is defined in an item of Job Settings 804. The setting value changed from a default setting is stored in the job Settings 804. With respect to a value not set in the Job Settings 804, the image forming device 101 executes a job by interpolating by a default value set in the image forming device 101.

For example, in the case of the user AAA, the recommend button for executing copy has the highest display priority, and three copies, monochrome, and duplex print are set as a job setting. In the case of a user BBB, the recommend button for executing print has the highest display priority, and monochrome and duplex print are set.

FIG. 9 illustrates an example of the device capability information transmitted by the image forming device 101 to the server system 102 according to the present exemplary embodiment. In the present exemplary embodiment, a description will be given of an example of a message at the time of notifying the device capability information by Internet Printing Protocol (IPP). The notification of the device capability information may be made by Management Information Base (MIB) or a unique protocol.

In a value 901, the image forming device 101 returns "true" to "color-supported", which is an attribute indicating whether the image forming device 101 supports color print, thereby notifying the server system 102 that the image forming device 101 has the color print capability. In a case where the image forming device 101 does not support color print and is only capable of monochrome print, the image forming device 101 returns "false".

In a value 902, the image forming device 101 returns "one-sided" to "sides-supported", which is an attribute indicating whether the image forming device 101 has a duplex print capability, thereby indicating that the image forming device 101 only has a simplex print capability. In a case where the image forming device 101 can perform duplex print, the server system 102 is notified of "two-sided".

In addition, the image forming device 101 returns "none" to "finishing-supported" which is an attribute indicating whether the image forming device 101 has a finishing capability, thereby indicating that the image forming device 101 has no finishing capability such as stapling or punching. In a case where the image forming device 101 is capable of binding processing by stapling, the server system 102 is notified of "staple". In a case where the image forming device 101 is capable of punching processing to punch a hole in paper, the server system 102 is notified of "punch". In a case where the image forming device 101 is capable of executing a plurality of post-processes, the server system 102 is notified of all the plurality of post-processes as the device capability information. Besides these, positions where stapling can be made and the number of stapling that can be made, and positions where punching can be made and the number of punch holes that can be made may be transmitted as the device capability information.

The server system may be notified of the presence/absence of the reading unit 209, a higher limit/lower limit of reading resolution at the reading unit 209, the presence/absence of the fax function, and the like, in addition to the above, as the device capability information. A server system 102 determines whether the recommend button information in correspondence with the log-in user includes button information that is inexecutable by the image forming device 101 that makes a request for the recommend button information, on the basis of the received device capability information.

FIG. 10A illustrates an example of the recommend button filter information table 511 of the server system 102 according to the present exemplary embodiment. The recommend button filter information table 511 is a table to determine recommend button information to be excluded from recommend button information to be transmitted on the basis of each value of capability information included in the device capability information.

An item of device capabilities 1011 is a name of each capability of the image forming device 101 included in the device capability information. The device capabilities 1011 is the item that is the same as the device capability information to be notified in FIG. 9.

An item of value 1012 defines a value at which each capability defined in the device capabilities 1011 is filtered.

An item of function 1013 defines a function to be restricted when the device capabilities 1011 takes a value of the value 1012. The function 1013 includes, for example, print, scan, and fax. A relationship between the function 1013 and the Job Type 803 will be described below with reference to FIG. 10B.

Items of settings 1014 and setting's value 1015 indicate a combination of a setting item and setting value of the job when the recommend button information is excluded from the recommend button information to be transmitted. A setting item of "color_mode" in the settings 1014 indicates that print is color print or monochrome print. A value of "color" indicates the color print and a value of "mono" indicates the monochrome print. A value of "plex" indicates whether print is the duplex print or the simplex print. A value of "simplex" indicates the simplex print, and a value of "duplex" indicates the duplex print. A value of "staple" indicates a binding processing stetting, and a value of "except none" indicates "other than case of none (case of not performing stapling)". That is, it indicates that, in a case where a stapling setting has been set, the stapling is a target of exclusion by filtering regardless of a content of the setting. A value of "resolution" indicates a print resolution. In a case where a resolution allocated to the recommend button is not a resolution executable by the image forming device 101, the recommend button information is excluded from the recommend button information to be transmitted.

For example, in a case where the image forming device 101 notifies the server system 102 of the value 1012 of a setting item of "color-supported" being "false" as the device capability information, the server system 102 does not transmit a recommend button that designates a setting value of a color-mode setting of the print function as color.

In addition, a setting item of "printer-resolution-supported" of the capability information indicates a resolution that can be designated by the image forming device 101. A value of "do not match device" is designated in the table illustrated in FIG. 10A. The "do not match device" indicates that the recommend button information to which any resolution is set is filtered unless resolution can be supported by the image forming device 101.

FIG. 10B illustrates an example of a definition table indicating what kind of functions constitute a job executed in the image forming device 101 according to the present exemplary embodiment. That is, FIG. 10B illustrates a relationship between the Job Type 803 illustrated in FIG. 8 and the function 1013 illustrated in FIG. 10A. Assume that the table is stored in both the server system 102 and the image forming device 101.

An item of job type 1021 defines a type of a job. An item of functions 1022 defines what kind of functions constitute each job type. For example, it is indicated that an item of "copy" in the Job Type 102 is composed of the scan function to read an original document by the reading unit 209 and the print function to print an image on the print unit 211. It is indicated that an item of "send to email" is composed of the scan function and the send function to send image data generated by the reading unit 209 by e-mail. It is indicated that an item of "send to box" is composed of the send function and a box function to store image data generated by the reading unit 209 in an HDD of the image forming device 101. It is indicated that an item of "send to memory" is composed of the send function and a memory function to store image data generated by the reading unit 209 in an external memory such as a USB memory. It is indicated that an item of "fax receive" is composed of the fax function using telephone lines, a receive function to receive data from the outside, and the print function. An item of "fax memory receive" is composed of the fax function, the receive function, and the memory function. It is indicated that an item of "print" is composed of only the print function.

FIG. 11 is a diagram illustrating an example of the recommend button information transmitted from the server system 102 to the image forming device 101 in step S706, according to the present exemplary embodiment.

In the present exemplary embodiment, a description will be given of an example of transmitting the recommend button information as a JavaScript (registered mark) Object Notation (JSON) file. The recommend button information may be transmitted using Extensible Markup Language (XML) or the like. In addition, besides the recommend button information, a HyperText Markup Language (HTML) file including layout information of the whole of the home screen may be transmitted.

The recommend button information to be transmitted includes information for generating a recommend button to be displayed on the home screen and job information of the corresponding recommend button.

The information for generating the recommend button includes a button name 1101, an icon image 1102, a display text 1103, and a priority 1104.

The button name 1101 is a name added to an icon to be displayed on the home screen illustrated in FIG. 6A.

The icon image 1102 is information for identifying a file of an icon image to be displayed on the home screen illustrated in FIG. 6A.

The display text 1103 is a character string to be displayed on the home screen to indicate what kind of setting has been made to the corresponding recommend button. Here, setting values of respective three setting items designated by the recommend button information are stored as the character string. In a case where there are three or more setting items designated by the recommend button information, setting values of respective three setting items having higher priorities are stored as the display text 1103 in order of predetermined priority.

The priority 1104 is information indicating a display priority when the corresponding recommend button is displayed on the home screen.

The job information of the recommend button corresponds to a job type 1105 to which the recommend button corresponding to the recommend button information belongs and a setting 1106. The job type 1105 included in the recommend button information is the same as the Job Type 803 illustrated in FIG. 8, and the job type 1021 illustrated in FIG. 10B.

The job type 1105 is information to be used at the time of filtering the recommend button information. The setting 1106 indicates a setting item to be changed from a default setting at the time of executing a job and a setting value of the setting item.

FIG. 11 illustrates the recommend button information including information of two recommend buttons whose names are "Copy" and "Print". While FIG. 11 illustrates the information of the two recommend buttons, the server system 102 transmits information of a predetermined number of recommend buttons to the image forming device 101.

Figure 12:
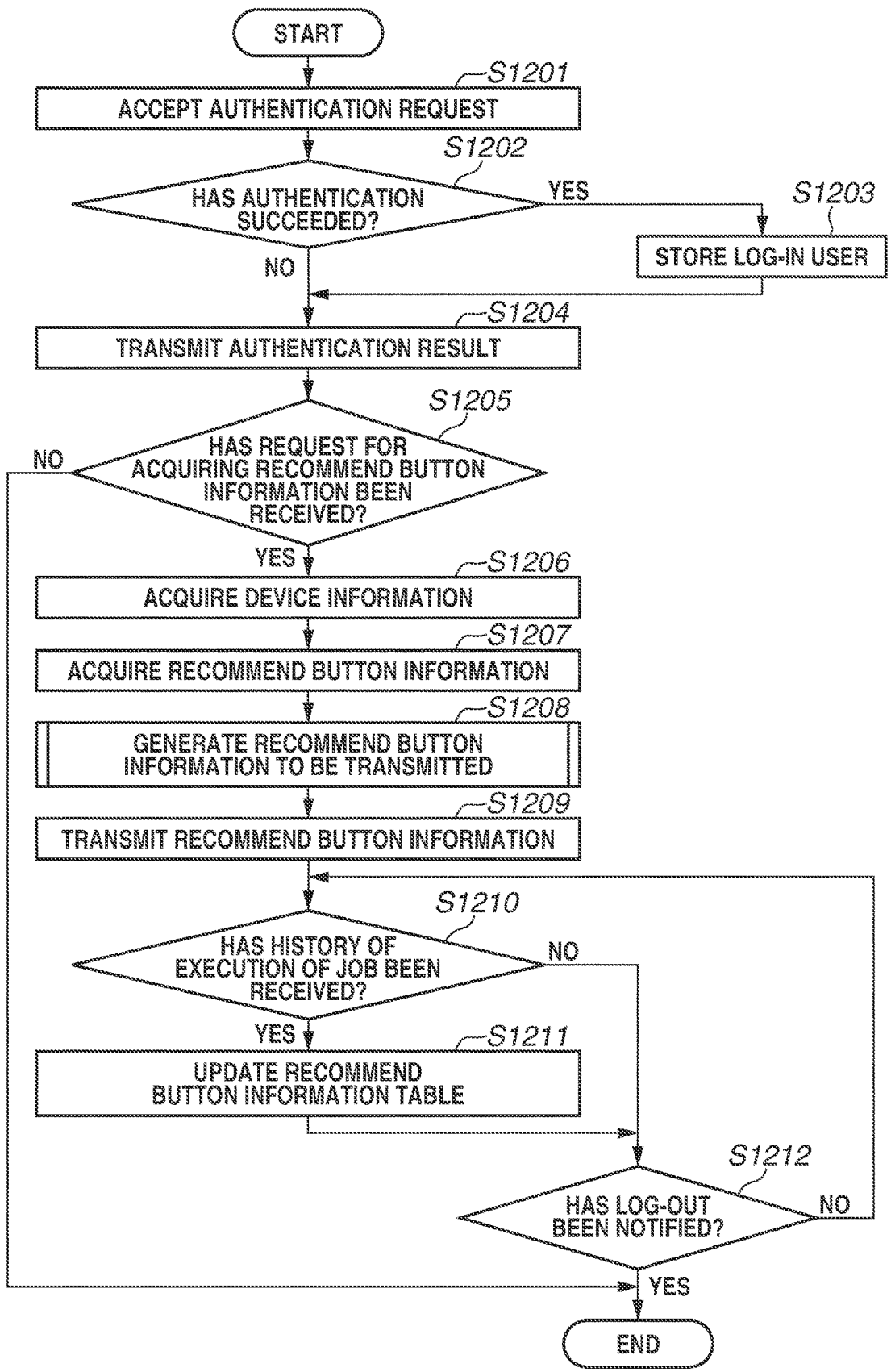
FIG. 12 is a flowchart illustrating processing of the server system to transmit the recommend button information to the image forming device.

FIG. 12 is a flowchart illustrating processing of the server system 102, after accepting the authentication request from the image forming device 101, to generate the recommend button information to be transmitted to the image forming device 101 and update the recommend button information. A program to execute the processing illustrated in FIG. 12 is stored in the ROM 402 or HDD 404 of the server system 102, and the processing is implemented by the CPU 401 reading and executing the program.

In step S1201, the authentication processing unit 501 of the server system 102 accepts a request for authentication from the image forming device 101. The authentication processing unit 501 receives information for identifying a log-in user of the image forming device 101 such as a user name and a password from the image forming device 101 to execute authentication processing.

In step S1202, the authentication processing unit 501 determines whether the authentication has succeeded.

In a case where the authentication has succeeded (YES in step S1202), the processing proceeds to step S1203. In step S1203, the authentication processing unit 501 stores the log-in user in the storage unit 508. In a case where the authentication has failed (NO in step S1202), the processing proceeds to step S1204.

In S1204, the authentication processing unit 501 transmits a result of the authentication indicating whether the authentication has succeeded or failed to the image forming device 101 at a timing of the determination in step S1202.

In step S1205, the recommend button information transmission unit 506 of the server system 102 determines whether the recommend button information transmission unit 506 has received a request for acquiring recommend button information from the image forming device 101. In a case where the recommend button information transmission unit 506 has received the request for acquiring the recommend button information (YES in step S1205), the processing proceeds to step S1206. On the other hand, in a case where the recommend button information transmission unit 506 has not received the request for acquiring the recommend button information (NO in step S1205), the CPU 401 of the server system 102 ends the processing illustrated in FIG. 12. The recommend button information transmission unit 506 determines that it has not received the request for acquiring the recommend button information if it has not received the request in a predetermined period of time. In step 1205, the recommend button information transmission unit 506 acquires device capability information of the image forming device 101 that has made the request together with the request for acquiring the recommend button information.

In step S1206, the device information reception unit 504 stores the device capability information acquired from the image forming device 101 in the storage unit 508.

In step S1207, the button filter unit 505 acquires recommend button information of the log-in user stored in the storage unit 508 from the recommend button information table 510. In step S1207, the button filter unit 505 acquires a record in which the User 801 in the recommend button information table illustrated in FIG. 8 matches with the log-in user stored in the processing step S1203.

In step S1208, the button filter unit 505 executes filtering processing of the acquired recommend button information, and generates recommend button information to be transmitted to the image forming device 101. Details of the processing in step S1208 executed by the button filter unit 505 will be described in detail below with reference to FIG. 13.

In step S1209, the recommend button information transmission unit 506 transmits the recommend button information filtered by the button filter unit 505 to the image forming device 101. Here, the recommend button information corresponding to a predetermined number of recommend buttons is transmitted as one piece of data to the image forming device 101. The image forming device 101 displays the recommend buttons on the home screen 601 on the basis of the received recommend button information. The user selects a recommend button, to which a setting for a function desired to be executed is allocated, from the recommend buttons displayed on the home screen 601. The image forming device 101 then executes a job with the setting allocated to the selected recommend button.

In step S1210, the job history reception unit 502 determines whether it has received information of the job, which has been executed in response to the user's instruction, from the image forming device 101. The job history reception unit 502 stores a received job history in the job history table 509. In a case where the job history reception unit 502 has received the information of the job (YES in step S1210), the processing proceeds to step S1211. On the other hand, in a case where the job history reception unit 502 has not received the information of the job (NO in step S1210), the processing proceeds to step S1212.

In step S1211, the recommend button information table update unit 507 updates the recommend button information regarding the user who has instructed the execution of the job and stored in the recommend button information table 510, on the basis of the added job history. In step S1211, the recommend button information table update unit 507 determines whether a job history having the same Job Settings as the received job history is stored in the job history table 509 of the server system 102. If there is no job history having the same setting as the received job history in the job history table 509, the recommend button information table update unit 507 adds the received job history to the job history table 509, and sets the number of usage times to one. If there is the job history having the same setting as the received job history in the job history table 509, the recommend button information table update unit 507 increases a count of the number of usage times, which is counted in the job history table 509, by the received number of job histories. Thereafter, the recommend button information table update unit 507 sorts job histories in descending order of the number of usage times, and registers a predetermined number of pieces of recommend button information in the recommend button information table 510 in descending order of the number of usage times. In this manner, the recommend button information table 510 is updated.

In step S1212, after the processing in step S1210 or step S1211, the authentication processing unit 501 determines whether it has been notified of the user's log-out. If the authentication processing unit 501 has been notified of the user's log-out (YES in step S1212), the processing illustrated in FIG. 12 ends. If the authentication processing unit 501 has not been notified of the user's log-out (NO in step S1212), the processing returns to step S1210.

Figure 13:
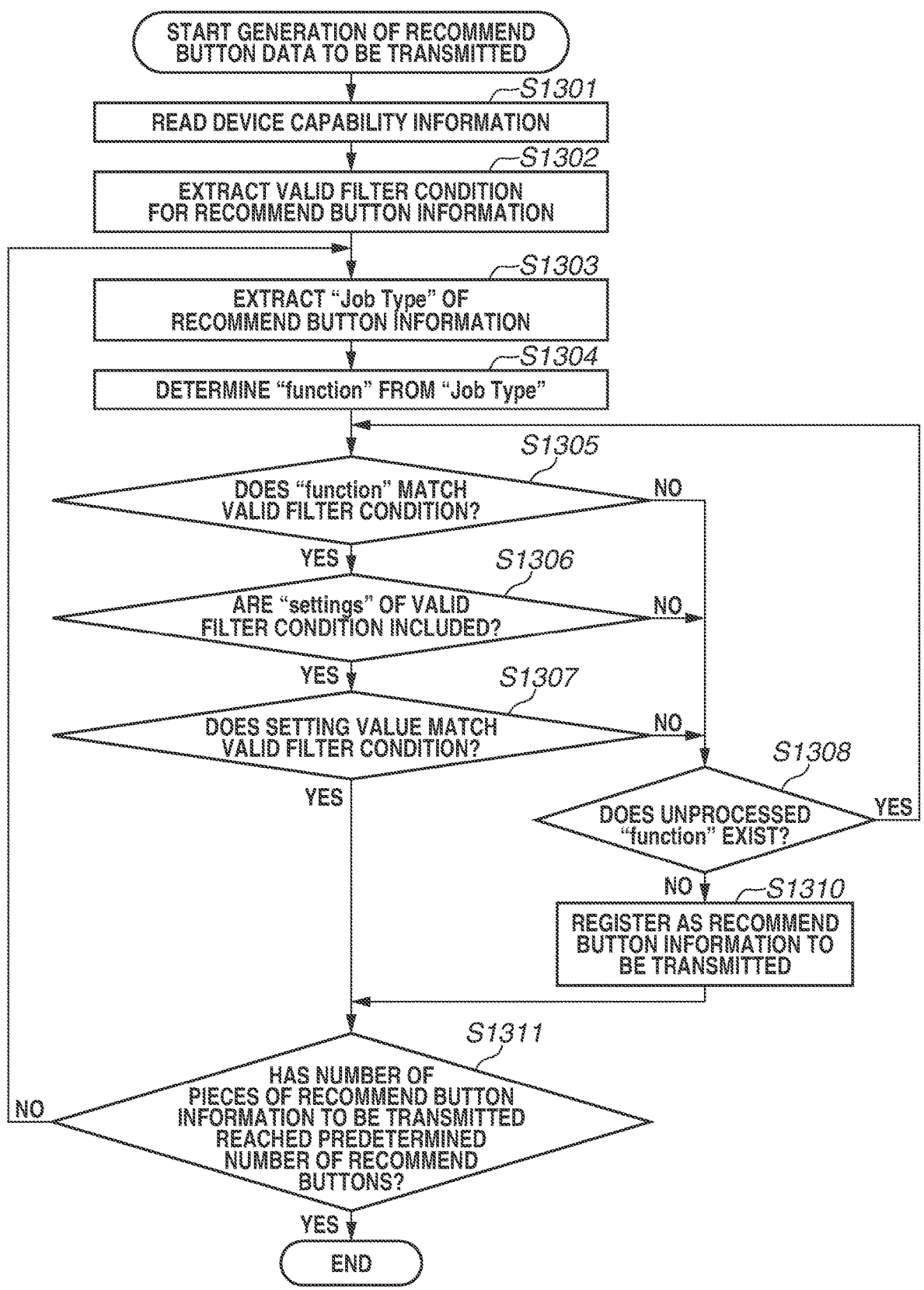
FIG. 13 is a flowchart illustrating processing of the server system to filter the recommend button information to be transmitted to the image forming device.

FIG. 13 is a flowchart illustrating processing executed in step S1208 illustrated in FIG. 12 in which the button filter unit 505 filters the recommend buttons to generate the recommend button data to be transmitted. A program to execute the processing illustrated in FIG. 12 is stored in the ROM 402 or HDD 404 of the server system 102, and the processing is implemented by the CPU 401 reading and executing the program.

In step S1301, the button filter unit 505 reads the device capability information of the image forming device 101 acquired by the device information reception unit 504. In step S1301, the button filter unit 505 reads the device capability information received in step S1205 illustrated in FIG. 12. The button filter unit 505 then extracts device capability information regarding filtering in the recommend button information from the read device capability information. For example, in a case where the device capability information received by the server system 102 from the image forming device 101 is the device capability information illustrated in FIG. 9, the button filter unit 505 reads values of the setting items of "color-supported", "sides-supported", and "finishings-supported".

The button filter unit 505 extracts filtering information corresponding to the device capability information read in step S1301 from the recommend filter information table illustrated in FIG. 10A, and stores the filtering information in the storage unit 508 as valid filter conditions. The button filter unit 505 extracts a record corresponding to the device capability information acquired in step S1301 and a setting value of the device capability information from the recommend button filter information table illustrated in FIG. 10A. The button filter unit 505 extracts a record in which an item name of the acquired device capability information matches with a setting item of "device capabilities" illustrated in FIG. 10A, and a value of the acquired capability information matches with a value illustrated in FIG. 10A. For example, in a case where the device capability information acquired in step S1301 is ["sides-supported"="one-sided"], the second record from the top in the table illustrated in FIG. 10A is extracted. In the extracted record, [sides-supported: one-sided: print: plex: duplex] is set. In a case where the device capability information acquired in step S1301 is ["finishings-supported"="none"], the third record from the top in the table illustrated in FIG. 10A is extracted. In the record, [finishings-supported: none: print: staple: except none] is set.

The processing in step S1303 and the subsequent steps is the filtering processing to determine the recommend button information to be transmitted to the image forming device 101. The processing in steps S1303 to S1311 is repeated in the order of priority of the recommend button information (in ascending order of the Prior illustrated in FIG. 8) until the number of pieces of recommend button information to be transmitted to the image forming device 101 reaches a predetermined number. In a case where the number of pieces of recommend button information to be transmitted does not reach the predetermined number even though the processing in steps S1303 to S1311 is executed on all the recommend button information in association with the authenticated user, the CPU 401 ends the processing illustrated in FIG. 13.

In step S1303, the button filter unit 505 extracts a value of the Job Type of the recommend button information of the log-in user extracted in step S1207. For example, in the case of the first record of the table illustrated in FIG. 8, the Job Type of "copy" is extracted.

Subsequently, in step S1304, the button filter unit 505 determines functions constituting the Job Type of the recommend button from the job type and constituent functions defined in FIG. 10B. For example, in a case where the Job Type is copy, it is determined that functions to be used are print and scan.

Subsequently, in steps S1305 to S1308, the button filter unit 505 determines whether the recommend button information whose Job Type has been acquired in step S1303 is information of a recommend button executable by the image forming device 101.

In step S1305, the button filter unit 505 compares each acquired function and any function of the valid filter conditions stored in step S1302 to match with each other. The button filter unit 505 acquires a filter condition in which a function is print among the valid filter conditions extracted in step S1302. Here, the second record illustrated in FIG. 10A and the third record illustrated in FIG. 10A are acquired.

In a case where there is no filter condition of a function that is the same as a function determined on the basis of the Job Type of the recommend button information among the valid filter conditions extracted in step S1302 (NO in step S1305), the processing proceeds to step S1308.

In a case where there is the filter condition of a function determined on the basis of the Job Type of the recommend button information among the valid filter conditions (YES in step S1305), the processing proceeds to step S1306. In step S1306, the button filter unit 505 determines whether settings of the valid filter conditions extracted in step S1305 are defined in the recommend button information. In a case where the second and third records illustrated in FIG. 10A are extracted in step S1305, the button filter unit 505 determines whether setting items "plex" and "staple" are included in the recommend button information. In a case where the recommend button information is the first information illustrated in FIG. 8, "plex" is included in the recommend button information, but "staple" is not included in the recommend button information. In this case, since at least one setting item indicated by the valid filter conditions is included in the recommend button information (YES in step S1306), the processing proceeds to step S1307. On the other hand, in a case where none of the setting items set by the valid filter conditions is included in the recommend button (NO in step S1306), the processing proceeds to step S1308.

In step S1307, the button filter unit 505 determines whether a setting value defined in the setting's value 1015 included in the valid filter conditions matches with a setting value included in the recommend button information. With respect to a setting value of "plex" determined to be included in the recommend button information in step S1306, the button filter unit 505 determines whether a setting value of "plex" of the valid filter conditions and a setting value of "plex" included in the recommend button information matches with each other. The setting value of "plex" in the recommend button information in the first record in the table illustrated in FIG. 8 is duplex (double-sided), while the setting value of "plex" of a filter condition in the second record of the table illustrated in FIG. 10A that is one of the valid filter conditions is also duplex. In this case, the processing proceeds to step S1311. In a case where the setting value included in the recommend button information and the setting value included in valid filter conditions are different from each other (NO in step S1307) the processing proceeds to step S1308.

In step S1308, the button filter unit 505 determines whether there is any function not subjected to the processing in steps S1305 to S1307. In a case where there is a function not subjected to the processing in steps S1305 to S1307 (YES in step S1308), the processing returns to step S1305. In a case where there is no unprocessed function (NO in step S1308), the processing proceeds to step S1310. In the above-described example, the processing in steps S1305 to S1307 has not yet been executed with respect to scan, so that the processing returns to step S1305.

In step S1310, the button filter unit 505 causes the memory to store the recommend button information on which determination on filtering has been made as the recommend button information to be transmitted to the image forming device 101.

In step S1311, the button filter unit 505 determines whether the number of pieces of recommend button information registered as the recommend button information to be transmitted to the image forming device 101 has reached a predetermined number of recommend buttons. In a case where the number of pieces of recommend button information stored as the recommend button information to be transmitted has reached the predetermined number of recommend buttons (YES in step S1311), the button filter unit 505 ends the processing illustrated in FIG. 13. In a case where the number of pieces of recommend button information to be transmitted has not reached the predetermined number of recommend buttons (NO in step S1311), the processing returns to step S1303. The button filter unit 505 then executes the processing in step S1303 and the subsequent steps with respect to the recommend button information in the next order of priority.

The button filter unit 505 repeats the processing until the number of recommend buttons becomes the predetermined number of recommend buttons as a result of filtering. This can prevent transmission of the recommend button information for functions inexecutable by the image forming device 101.

In FIG. 13, the server system 102 is configured not to transmit to the image forming device 101 the recommend button information to which the setting inexecutable by the image forming device 101 is allocated on the basis of the device capability information of the image forming device 101. Alternatively, with respect to the recommend button information to which the setting inexecutable by the image forming device 101 is allocated, the server system 102 may be configured to transmit to the image forming device 101 by changing the setting allocated to the recommend button information to the setting executable by the image forming device 101. Assume that the server system 102 tries to transmit the second recommend button information from the top in the table illustrated in FIG. 8 to the image forming device 101 that does not support color print. At this time, the server system 102 changes "color_mode: color" included in the Job Settings of the recommend button information to "color_mode: mono" executable by the image forming device 101, and then transmits the value. This configuration allows even the image forming device that cannot execute the setting allocated to the recommend button information stored in the server system 102 to execute a job with the setting allocated to the received recommend button information. Alternatively, the server system 102 may be configured to lower a display priority of the recommend button information to which the setting inexecutable by the image forming device 101 is allocated in accordance with the device capability information of the image forming device 101. For example, the server system 102 makes a priority of the recommend button information determined to be inexecutable by the image forming device 101 as a result of filtering to the lowest priority among priorities of the recommend button information registered in the recommend button information table. This configuration can prevent the recommend button to which the setting inexecutable by the image forming device 101 is allocated from being displayed ahead of the recommend button executable by the image forming device 101.

FIG. 14 illustrates an example of the recommend button filter information table 313 used by the image forming device 101 to filter the recommend button information received from the server system 102, according to the present exemplary embodiment.

An item of device status 1411 indicates the status of the image forming device 101. Setting items of "color toner out" and "black toner out" indicate that the image forming device 101 runs out of toner of respective colors. A setting item "jam" indicates paper jam. Setting items of "staple out" and "A4 paper out" indicate the image forming device 101 runs out a staple and A4 paper, respectively. A setting item of "scan sensor error" indicates that an error occurs in a scan sensor and a normal scan image cannot be acquired.

An item of function 1412 indicates which functions become unavailable when respective errors occur. The function illustrated in FIG. 14 is similar to the function 1013 illustrated in FIG. 10A and the functions 1022 illustrated in FIG. 10B. Items of settings 1413 and setting's value 1414 indicate a combination of a setting item and setting value that are inexecutable in each device status.

For example, in a case where the device status 1411 is "color toner out" indicating an out-of-color toner status, the image forming device 101 performs control not to display a recommend button with a color mode being set to color on the home screen at the time of executing a print-related job. In addition, in a case where the device status 1411 is "scan sensor error" indicating a scanner sensor error, the image forming device 101 performs control not to display any recommend button using the reading unit 209 because the image forming device 101 cannot execute a job composed of a scan function.

Figure 15:
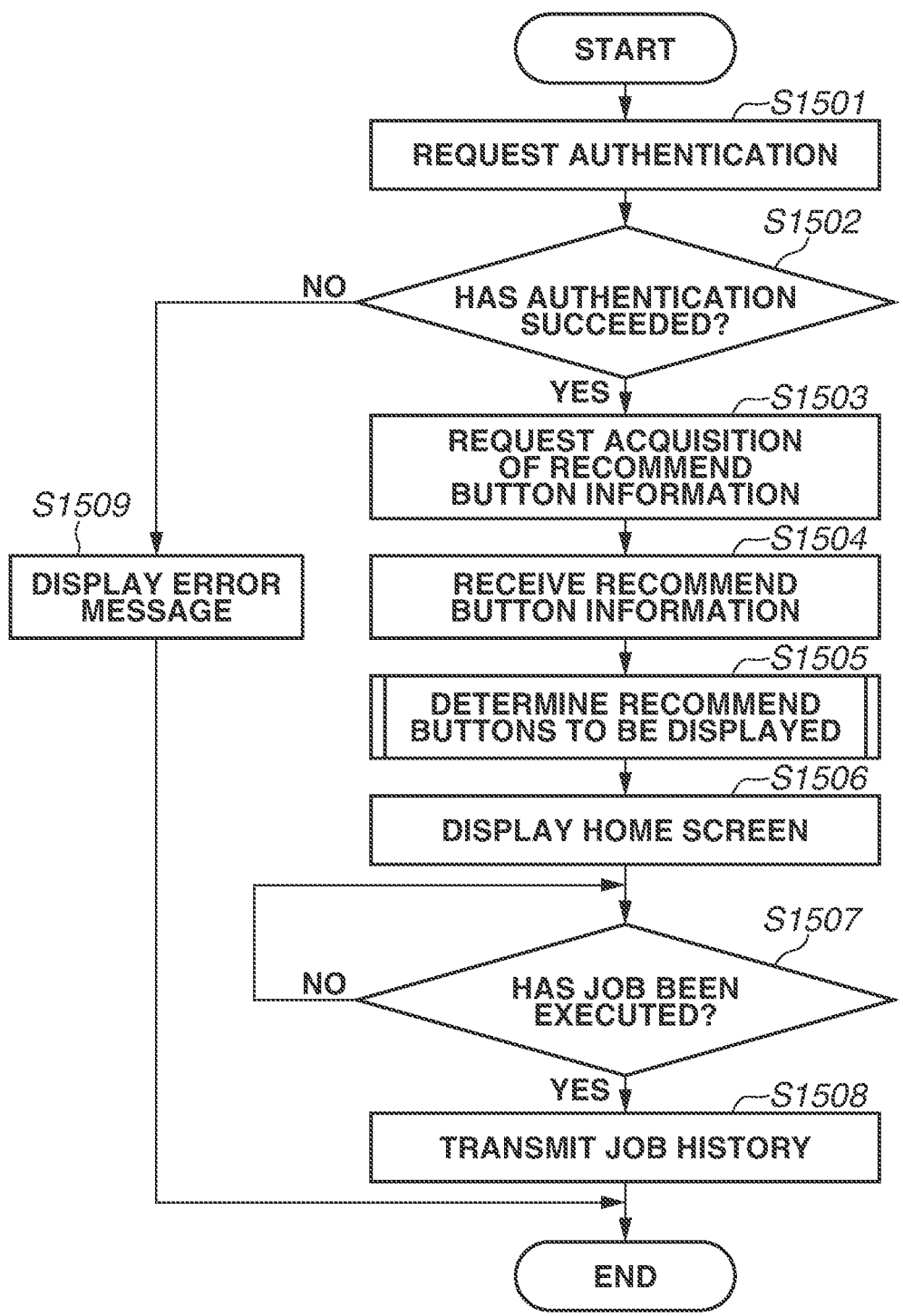
FIG. 15 is a flowchart illustrating processing of the image forming device to display a home screen using the recommend button information.

FIG. 15 is a flowchart illustrating processing of the image forming device 101 according to the present exemplary embodiment, after the user logs in the image forming device 101, to display the home screen including the recommend buttons and execute a job. A program to execute the processing illustrated in FIG. 15 is stored in the ROM 202 or the storage 204, and the processing is implemented by the CPU 201 reading and executing the program.

In step S1501, the authentication processing unit 306 accepts a log-in request from the user. The authentication processing unit 306 transmits log-in information to the server system 102 to request authentication. In step S1502, the authentication processing unit 306 determines whether it has been notified of success of the authentication from the server system 102. In a case where the authentication processing unit 306 has been notified of the success of the authentication (YES in step S1502), the processing proceeds to step S1503 and the subsequent steps. In a case where the authentication processing unit 306 has not been notified of the success of the authentication (NO in step S1502), the processing proceeds to step S1509. In step S1509, the UI control unit 302 displays a message that notifies the user of a log-in error. After displaying the error message, the CPU 201 ends the processing illustrated in FIG. 15.

In a case where the authentication has succeeded (YES in step S1502), the processing proceeds to step S1503. In step S1503, the recommend button information acquisition unit 309 transmits a request for acquiring the recommend button information to the server system 102. In step S1503, the recommend button information acquisition unit 309 transmits to the server system 102 the device capability information of the image forming device 101 stored in the device information table 311 together with the request for acquiring the recommend button information.

In step S1504, the recommend button information acquisition unit 309 acquires the recommend button information illustrated in FIG. 11 from the server system 102 and stores the recommend button information in the recommend button information table 312. In step S1504, the image forming device 101 receives data that groups a predetermined number of pieces of recommend button information from the server system 102.

In step S1505, the recommend button generation unit 304 determines recommend buttons to be displayed on the home screen 601 on the basis of the received recommend information and the recommend button filter information table 313. In step S1505, details of the processing executed in step S1505 will be described below with reference to FIG. 16.

In step S1506, the home screen generation unit 303 generates the home screen 601 on the basis of the recommend buttons determined in step S1505, and causes the operation unit 207 to display the home screen 601 via the UI control unit 302. The home screen generation unit 303 generates home screen information by grouping the recommend button information and information such as icons and texts to be arranged on the home screen 601. The CPU 201 then causes the UI control unit 302 to display the home screen 601 based on the generated home screen information.

In step S1507, the control unit 301 accepts an instruction for executing a job from the user, and determines whether the job has been executed. In a case where the job has been executed (YES in step S1507), the processing proceeds to step S1508. In step S1508, the job history transmission unit 308 stores information of the executed job in the job history table 314, as well as transmitting the information to the server system 102.

In step S1601, the recommend button generation unit 304 controls the device information management unit 307 to acquire information indicating the current device status stored in the RAM 203. Here, assume that color toner runs out, and a status of "color toner out" is occurring.

In step S1602, the recommend button generation unit 304 extracts filter conditions corresponding to information of the device status occurring in the image forming device 101 from the recommend button filter information table illustrated in FIG. 14. The recommend button generation unit 304 extracts the first record from the table illustrated in FIG. 14, when the status of "color toner out" occurs. The record indicates that the recommend button information with the "color_mode" of the print function being set to color is filtered out when color toner runs out.

Subsequently, in steps S1603 to S1608, the recommend button generation unit 304 determines whether to display each of the recommend buttons corresponding to the received recommend button information on the home screen.

In step S1603, the recommend button generation unit 304 acquires the Job Type of one piece of recommend button information acquired from the server system 102 in step S1504. Assume that the recommend button generation unit 304 receives the fifth record [User: AAA, Prio: 5, Job Type: print, Job Settings: color_mode: color, plex: simplex] illustrated in FIG. 8 from the server system 102. In this case, the recommend button generation unit 304 determines that the Job Type is print.

In step S1604, the recommend button generation unit 304 acquires functions constituting the Job Type of the recommend button from the job and constituent functions defined in the table illustrated in FIG. 10B. The recommend button generation unit 304 determines that the Job Type being print corresponds to the function being print on the basis of the table illustrated in FIG. 10B.

In step S1605, the recommend button generation unit 304 determines whether each function identified in step S1604 is included in the functions of the valid filter conditions extracted in step S1602. The device status of "color toner out" in the first record illustrated in FIG. 14 corresponds to a filter condition for a recommend button whose function is print. Since the recommend button being in execution also relates to print, the processing proceeds to step S1606.

In a case where each function determined on the basis of the Job Type of the recommend button information does not match with any of the functions of the valid filter conditions (NO in step 1605), the recommend button generation unit 304 determines whether there is any function not subjected to the processing in step S1605. In a case where there is a function not subjected to the processing in step S1605, the processing returns to step S1605. The recommend button generation unit 304 then executes the processing in step S1605 with respect to the next function. On the other hand, in a case where the processing in step S1605 has been completed with respect to all the functions determined on the basis of the Job Type corresponding to the recommend button information being in execution, the recommend button generation unit 304 executes the following processing. The recommend button generation unit 304 determines whether the processing in step S1603 has been executed with respect to all the recommend button information received from the server system 102. In a case where the processing in step S1603 has been executed with respect to all the received recommend button information, the recommend button generation unit 304 ends the processing illustrated in FIG. 16. In a case where there is unprocessed recommend button information, the processing returns to the processing in step S1603.

In a case where each function determined on the basis of the Job Type of the recommend button information matches with any one of the functions of the valid filter conditions (YES in step 1605), the processing proceeds to step S1606. In step S1606, the recommend button generation unit 304 determines whether settings of the valid filter conditions are included in the recommend button information. In a case where the settings of the valid filter conditions are not included in the recommend button information (NO in step S1606), the processing proceeds to step after step S1608. On the other hand, in a case where the settings of the valid filter condition are included in the recommend button information (YES in step S1606), the processing proceeds to step S1607. For example, in a case where a valid filter condition is the first record in the table illustrated in FIG. 14, a value of the settings of the valid filter condition is "color_mode". In a case where the recommend button information being in execution is the recommend button information of the fifth record from the top in the table, the value of the settings is "color_mode", so that the processing proceeds to step S1607.

In step S1607, the recommend button generation unit 304 determines whether a setting's value of the valid filter condition is included in the Job Settings of the recommend button information. In a case where the setting's value of the valid filter condition is not included in the Job Settings of the recommend button information (NO in step S1607), the processing proceeds to step after step S1608.

Figure 16:
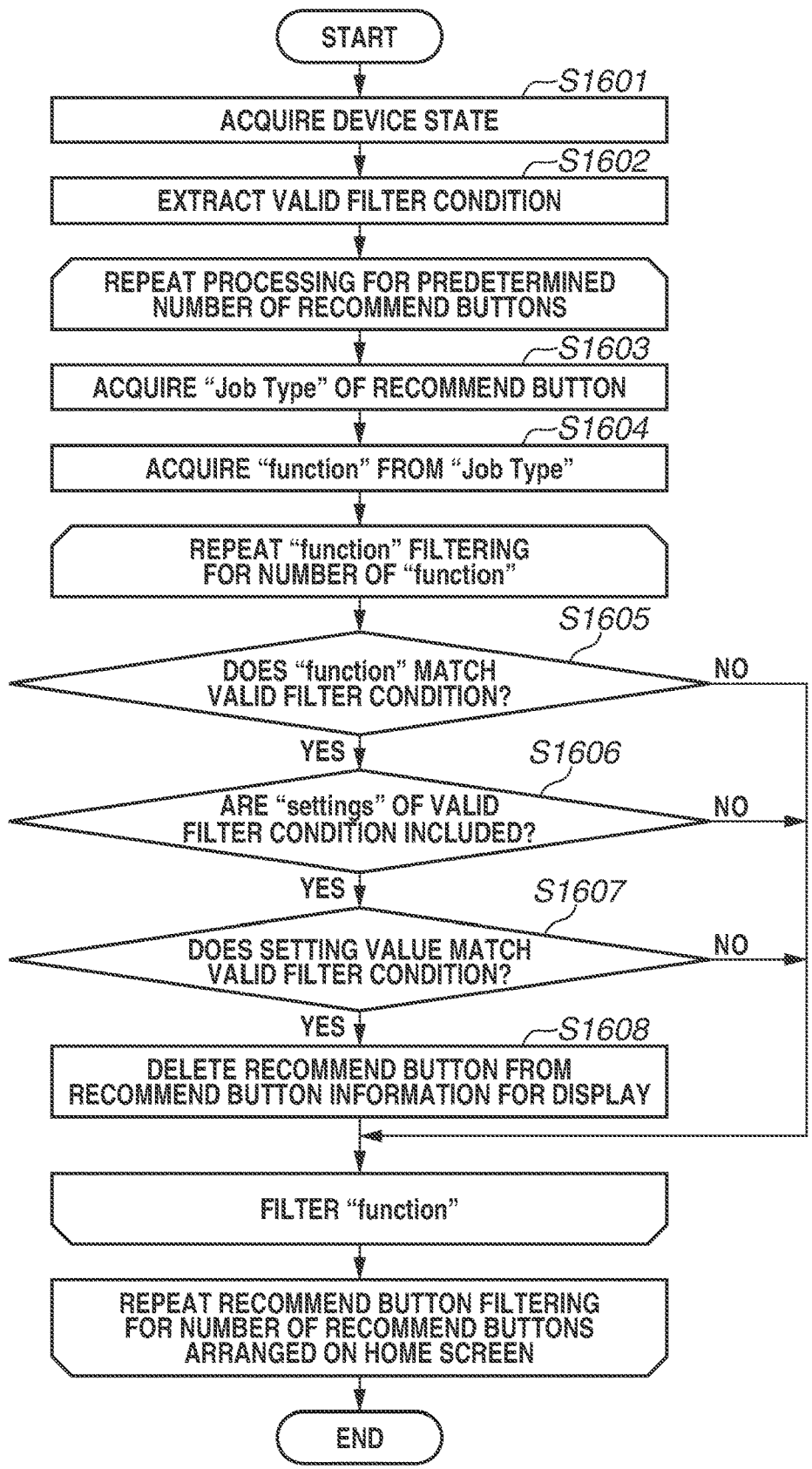
FIG. 16 is a flowchart illustrating processing of the image forming device to filter the recommend button information received from the server system.

The recommend button generation unit 304 repeats the processing in steps S1603 to S1608 described above for the number of pieces of recommend button information received from the server system 102, and ends the processing illustrated in FIG. 16. This configuration can prevent the recommend button information with a setting for a function that cannot be immediately executed by the image forming device 101 from being displayed on the home screen. The image forming device 101 may be configured such that a display priority of a recommend button with the setting for the function that cannot be immediately executed due to the device status of the image forming device 101 becomes lower. For example, in step S1608, the recommend button being in execution may be reset as the lowest priority (Prio) among the received recommend buttons. This can prevent the recommend button with the setting for the function that cannot be immediately executed by the image forming device 101 due to the status of the image forming device 101 from being displayed on the home screen in priority to the recommend button that can be immediately executed by the image forming device 101.

Alternatively, the recommend button with the setting for the function that cannot be immediately executed due to the device status of the image forming device 101 may be changed in setting so as to be immediately executed by the image forming device 101. For example, in a case where the status of "color toner out" occurs, the recommend button information with "color" being set to "color_mode" may be changed from "color" to "mono" in "color_mode" in step S1608. This can prevent the recommend button with the setting for the function that cannot be immediately executed by the image forming device 101 due to the status of the image forming device 101 from being displayed on the home screen.

In the present exemplary embodiment, in a case where the recommend button generation unit 304 acquires the recommend buttons in numbers greater than the predetermined number of recommend buttons to be arranged on the home screen and filters the acquired recommend buttons to reach the number of recommend buttons to be arranged, this flow ends. This can prevent even the recommend button that can be executed by the image forming device 101 in terms of the device capability but cannot be executed depending on the status of the image forming device 101 from being arranged on the home screen. In a case where the filtering of all the received recommend button information has been completed before the number of recommend buttons reaches the number of recommend buttons to be arranged, only the recommend buttons that can be arranged may be displayed, or the home screen that has the conventional function buttons without the recommend buttons may be displayed.

Other Exemplary Embodiment

Embodiments of the present disclosure can be implemented by executing the flowing processing. That is, the processing is executed such that software (program) to implement the functions of the exemplary embodiment described above is provided to a system or a device via a network or a storage medium of various types, and a computer (or a CPU or a microprocessing unit (MPU)) of the system or the device reads program codes and executes the processing. In this case, the computer program and the storage medium storing the computer program constitute embodiments of the present disclosure.

The server system described in the present application can display buttons to which settings in accordance with respective functions executable by the image forming device to which a user has logged in are allocated.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-235085, filed Dec. 25, 2019, which is hereby incorporated by reference herein in its entirety.

What is claimed is:

1. A server apparatus comprising:
a storage unit; and
a controller including a processor, the controller configured to:
receive, from a first image forming apparatus, a combination of setting values and a user identifier, wherein the combination of the setting values has been transmitted by the first image forming apparatus based on execution of a job;
store, in the storage unit, the combination of the setting values in association with the received user identifier;

receive capability information of a second image forming apparatus and the user identifier from the second image forming apparatus;

determine, based on the received capability information, whether the setting values corresponding to the stored combination include a setting value that is not supported by the second image forming apparatus;

transmit, in a case that the setting values corresponding to the combination do not include the setting value that is not supported by the second image forming apparatus, the combination to the second image forming apparatus, wherein the transmitted combination is to be used for displaying an object by the second image forming apparatus;

receive, from the second image forming apparatus, another combination of setting values and the user identifier, wherein said another combination of the setting values that has been used by the second image forming apparatus; and store, in the storage unit, said another combination received from the second image forming apparatus in association with the user identifier.

2. The server apparatus according to claim 1, wherein the setting value that is not supported by the second image forming apparatus is a setting value regarding a function that the second image forming apparatus is not able to execute.

3. The server apparatus according to claim 1,
wherein the storage unit is configured to store one or more combinations in association with the user identifier, and
wherein the controller is further configured to select the combination from the one or more combinations associated with the user identifier received from the second image forming apparatus.

4. The server apparatus according to claim 1, wherein the capability information is information indicating functions that the second image forming apparatus is able to execute.

5. The server apparatus according to claim 1, wherein the object displayed by the second image forming apparatus is an object for executing a job based on the setting values corresponding to the transmitted combination.

6. The server apparatus according to claim 3,
wherein the storage unit stores priority based on use frequency of the each combination, and
wherein the controller transmits information indicating the display priority of the combination.

7. An image forming system including a server apparatus, a first image forming apparatus, and a second image forming apparatus,
wherein the server apparatus comprises a storage unit and a controller that is configured to:
receive, from the first image forming apparatus, a combination of setting values and a user identifier, wherein the combination of the setting values has been transmitted by the first image forming apparatus based on execution of a job;
store, in the storage unit, the combination of the setting values in association with the received user identifier;
receive capability information of the second image forming apparatus and the user identifier from the second image forming apparatus;
determine, based on the received capability information, whether the setting values corresponding to the stored combination include a setting value that is not supported by the second image forming apparatus; and
transmit, in a case that the setting values corresponding to the combination do not include the setting value that is not supported by the second image forming apparatus, the combination to the second image forming apparatus, and wherein the second image forming apparatus includes a controller including a processor, the controller configured to:
receive, from the server apparatus, the transmitted combination;
display an object based on the received combination;
execute another job in accordance with the setting value corresponding to the received combination based on a user instruction for selecting the displayed object; and
transmit, to the sever apparatus, another combination of setting values that has been used by the second image forming apparatus and the user identifier, wherein the sever system stores said another combination in association with the user identifier.

8. The server apparatus according to claim 1, wherein the setting values include at least one of copies, color mode, and simplex printing.

9. The server apparatus according to claim 1, wherein the controller transmits information indicating a job type corresponding to the combination to the second image forming apparatus.

10. The server apparatus according to claim 9, wherein the object is an object corresponding to the received job type.

11. The server apparatus according to claim 1, wherein the controller transmits information indicating an icon corresponding to the combination, and wherein the information is used for displaying the object by the second image forming apparatus.

12. A server apparatus comprising:
a storage unit; and
a controller including a processor, the controller configured to:
receive, from a first image forming apparatus, a combination of setting values and a user identifier, wherein the combination of the setting values has been transmitted by the first image forming apparatus based on execution of a job;
store, in the storage unit, the combination of the setting values in association with the received user identifier;
receive capability information of a second image forming apparatus and the user identifier from the second image forming apparatus;
determine, based on the received capability information, whether the setting values corresponding to the stored combination include a setting value that is not supported by the second image forming apparatus; and
transmit, in a case that the setting values corresponding to the combination do not include the setting value that is not supported by the second image forming apparatus, the combination and information indicating a name corresponding to the combination to the second image forming apparatus, wherein the transmitted combination is to be used for displaying an object by the second image forming apparatus, and the name is to be displayed by the second image forming apparatus.

13. The server apparatus according to claim 1, wherein the setting values corresponding to the combination have been used by the first image forming apparatus for executing the job.

* * * * *